(12) United States Patent
Ying

(10) Patent No.: US 12,225,422 B2
(45) Date of Patent: Feb. 11, 2025

(54) DATA PROCESSING METHOD, APPARATUS, AND SYSTEM

(71) Applicant: HUAWEI TECHNOLOGIES CO., LTD., Guangdong (CN)

(72) Inventor: Jiangwei Ying, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 407 days.

(21) Appl. No.: 17/680,076

(22) Filed: Feb. 24, 2022

(65) Prior Publication Data
US 2022/0182910 A1 Jun. 9, 2022

Related U.S. Application Data

(63) Continuation of application No. PCT/CN2020/110661, filed on Aug. 22, 2020.

(30) Foreign Application Priority Data

Aug. 31, 2019 (CN) .......................... 201910819264.2

(51) Int. Cl.
  *H04W 36/18* (2009.01)
  *H04W 36/02* (2009.01)
  *H04W 36/00* (2009.01)

(52) U.S. Cl.
  CPC ...... *H04W 36/023* (2013.01); *H04W 36/0069* (2018.08)

(58) Field of Classification Search
  CPC ..... H04W 36/18; H04W 36/00; H04W 36/08; H04W 36/02; H04W 36/12; H04W 36/16;
  (Continued)

(56) References Cited

U.S. PATENT DOCUMENTS

| 9,282,491 B2 * | 3/2016 | Nakata | .............. H04W 36/0064 |
| 10,045,384 B2 * | 8/2018 | Lee | ........................ H04W 36/02 |

(Continued)

FOREIGN PATENT DOCUMENTS

| CA | 3033340 A1 | 2/2018 |
| CN | 108513726 A | 9/2018 |

(Continued)

OTHER PUBLICATIONS

3GPP TS 23.501 V16.1.0 (Jun. 2019), "3rd Generation Partnership Project; Technical Specification Group Services and System Aspects; System Architecture for the 5G System; Stage 2 (Release 16)," Jun. 2019, 367 pages.

(Continued)

*Primary Examiner* — Man U Phan
(74) *Attorney, Agent, or Firm* — Fish & Richardson P.C.

(57) ABSTRACT

This disclosure provides methods, apparatuses, and a system for implementing service continuity in a data flow switch procedure. One example method includes that indication information is used to indicate a data flow for which an end marker message is used. In the data flow switch procedure, after receiving the end marker message, a source access network device can correctly identify, based on the indication information, the data flow on which the end marker message works, and can perform different processing on a data flow switched to a target access network device and a data flow kept on the source access network device.

17 Claims, 12 Drawing Sheets

(58) Field of Classification Search
CPC ..... H04W 36/14; H04W 36/30; H04W 28/02;
H04W 36/38; H04W 28/12; H04W 28/24;
H04W 76/12; H04W 76/15; H04W 76/11;
H04W 76/22; H04W 76/32; H04W 76/34;
H04W 88/06; H04W 88/10; H04W 88/14;
H04W 88/16; H04W 88/18; H04W 40/36;
H04W 48/18; H04W 80/10; H04W 92/14
USPC .......................................................... 370/331
See application file for complete search history.

(56) References Cited

U.S. PATENT DOCUMENTS

| | | | | |
|---|---|---|---|---|
| 10,178,023 | B2* | 1/2019 | Hu | H04L 45/38 |
| 10,524,176 | B2* | 12/2019 | Decarreau | H04W 36/023 |
| 10,581,735 | B2* | 3/2020 | Hu | H04L 41/0806 |
| 11,109,263 | B2* | 8/2021 | Han | H04W 36/0069 |
| 11,134,009 | B2* | 9/2021 | Hu | H04L 45/38 |
| 11,140,691 | B2* | 10/2021 | Iskander | H04W 76/19 |
| 11,212,714 | B2* | 12/2021 | Xu | H04W 40/36 |
| 11,917,450 | B2* | 2/2024 | Han | H04W 80/08 |
| 2018/0213540 | A1 | 7/2018 | Chiu et al. | |
| 2019/0090257 | A1 | 3/2019 | Han et al. | |
| 2019/0174377 | A1 | 6/2019 | Decarreau et al. | |
| 2020/0015116 | A1* | 1/2020 | Huang | H04W 28/0268 |
| 2021/0400521 | A1* | 12/2021 | Fiorani | H04W 28/10 |
| 2022/0038941 | A1* | 2/2022 | Han | H04W 28/0268 |

FOREIGN PATENT DOCUMENTS

| | | |
|---|---|---|
| CN | 109548096 A | 3/2019 |
| CN | 109587732 A | 4/2019 |
| CN | 109691155 A | 4/2019 |
| CN | 110036683 A | 7/2019 |
| WO | 2018165982 A1 | 9/2018 |

OTHER PUBLICATIONS

3GPP TS 23.502 V16.1.1 (Jun. 2019), "3rd Generation Partnership Project; Technical Specification Group Services and System Aspects; Procedures for the 5G System; Stage 2 (Release 16)," Jun. 2019, 494 pages.

3GPP TS 29.281 V15.5.0 (Dec. 2018), "3rd Generation Partnership Project; Technical Specification Group Core Network and Terminals; General Packet Radio System (GPRS) Tunnelling Protocol User Plane (GTPv1-U) (Release 15)," Dec. 2018, 32 pages.

3GPP TS 37.340 V15.6.0 (Jun. 2019), "3rd Generation Partnership Project; Technical Specification Group Radio Access Network; Evolved Universal Terrestrial Radio Access (E-UTRA) and NR; Multi-connectivity; Stage 2 (Release 15)," Jun. 2019, 69 pages.

CATT, "Discussion on End marker for QoS flow offloading," 3GPP TSG-RAN WG3 #102, R3-186566, Spokane, WA, USA, Nov. 12-16, 2018, 3 pages.

NTT DOCOMO, Nokia, Alcatel-Lucent Shanghai Bell, "Procedures for Dual Connectivity," SA WG2 Meeting #122, S2-174573, San Jose del Cabo, Mexico, Jun. 26-30, 2017, 13 pages.

Office Action issued in Chinese Application No. 201910819264.2 on Jun. 24, 2021, 21 pages (with English translation).

PCT International Search Report and Written Opinion issued in International Application No. PCT/CN2020/110661 on Nov. 25, 2020, 13 pages.

ZTE, "(TP for NR BL CR for TS 37.340): Discussion on RAN initiated PDU session splitting," 3GPP TSG-RAN WG3 Meeting #102, R3-186349, Spokane, USA, Nov. 12-16, 2018, 4 pages.

Extended European Search Report issued in European Application No. 20858600.8 on Aug. 8, 2022, 7 pages.

ZTE Corporation, "Further discussion on End Marker," 3GPP TSG RAN WG3 #ad-hoc1807, R3-183666, Montreal, Canada, Jul. 2-6, 2018, 8 pages.

* cited by examiner

|       | Bits (Bits) | | | | | | |
|-------|---|---|---|---|---|---|---|
| Octets (Octets) | 8  7  6 | 5 | 4 | 3 | 2 | | 1 |
| 1 | Version (Version) | Protocol type (PT) | (*) | Extension header flag (E) | Sequence number flag (S) | | N-PDU number flag (PN) |
| 2 | Message type (Message Type) ||||||| 
| 3 | Length (Length) |||||||
| 4 | Length (Length) |||||||
| 5 | Tunnel endpoint identifier (Tunnel Endpoint Identifier) |||||||
| 6 | Tunnel endpoint identifier (Tunnel Endpoint Identifier) |||||||
| 7 | Tunnel endpoint identifier (Tunnel Endpoint Identifier) |||||||
| 8 | Tunnel endpoint identifier (Tunnel Endpoint Identifier) |||||||
| 9 | Sequence number (Sequence Number) |||||||
| 10 | Sequence number (Sequence Number) |||||||
| 11 | N-PDU number (N-PDU Number) |||||||
| 12 | QFI |||||||
| 13 | Next extension header type (Next Extension Header Type) |||||||

FIG. 4

| Octets (Octets) | Bits (Bits) | | | | | |
|---|---|---|---|---|---|---|
| | 8  7  6 | 5 | 4 | 3 | 2 | 1 |
| 1 | Version (Version) | Protocol type (PT) | (*) | Extension header flag (E) | Sequence number flag (S) | N-PDU number flag (PN) |
| 2 | Message type (Message Type) ||||||
| 3 | Length (Length) ||||||
| 4 | Length (Length) ||||||
| 5 | Tunnel endpoint identifier (Tunnel Endpoint Identifier) ||||||
| 6 | Tunnel endpoint identifier (Tunnel Endpoint Identifier) ||||||
| 7 | Tunnel endpoint identifier (Tunnel Endpoint Identifier) ||||||
| 8 | Tunnel endpoint identifier (Tunnel Endpoint Identifier) ||||||
| 9 | Sequence number (Sequence Number) ||||||
| 10 | Sequence number (Sequence Number) ||||||
| 11 | N-PDU number (N-PDU Number) ||||||
| 12 | QFI list ||||||
| 14 | Next extension header type (Next Extension Header Type) ||||||

FIG. 5

| Information element (information element) |
|---|
| QFI |
| Private extension (Private Extension) |

FIG. 6

| Information element (information element) |
|---|
| QFI list |
| Private extension (Private Extension) |

FIG. 7

| Octets (Octets) | Bits (Bits) | | | | | |
|---|---|---|---|---|---|---|
| | 8  7  6 | 5 | 4 | 3 | 2 | 1 |
| 1 | Version (Version) | Protocol type (PT) | (*) | Extension header flag (E) | Sequence number flag (S) | N-PDU number flag (PN) |
| 2 | Message type (Message Type) | | | | | |
| 3 | Length (Length) | | | | | |
| 4 | Length (Length) | | | | | |
| 5 | Tunnel endpoint identifier (Tunnel Endpoint Identifier) | | | | | |
| 6 | Tunnel endpoint identifier (Tunnel Endpoint Identifier) | | | | | |
| 7 | Tunnel endpoint identifier (Tunnel Endpoint Identifier) | | | | | |
| 8 | Tunnel endpoint identifier (Tunnel Endpoint Identifier) | | | | | |
| 9 | Sequence number (Sequence Number) | | | | | |
| 10 | Sequence number (Sequence Number) | | | | | |
| 11 | N-PDU number (N-PDU Number) | | | | | |
| 12 | (*) | | | | | indicator |
| 13 | Next extension header type (Next Extension Header Type) | | | | | |

FIG. 9

DATA PROCESSING METHOD, APPARATUS, AND SYSTEM

CROSS-REFERENCE TO RELATED APPLICATIONS

This application is a continuation of International Application No. PCT/CN2020/110661, filed on Aug. 22, 2020, which claims priority to Chinese Application No. 201910819264.2, filed on Aug. 31, 2019. The disclosures of the aforementioned applications are hereby incorporated by reference in their entireties.

TECHNICAL FIELD

This application relates to wireless communications technologies, and in particular, to a data processing method, an apparatus, and a system.

BACKGROUND

In a communications system, a bandwidth resource and a coverage area of a single access network device are limited. A multi-connection mode for providing a service for a terminal device by using radio resources of a plurality of access network devices can increase a data throughput of the terminal device, improve communication performance of the terminal device, and increase radio resource utilization.

Apart of data flows in a session established by the terminal device through a first access network device may be switched from the first access network device to a second access network device, and the terminal may receive different data flows of a same session from the first access network device and the second access network device. In the foregoing communication process, transmission of the data flows may be interrupted.

SUMMARY

Embodiments of this application provide a data processing method, an apparatus, and a system, to avoid a service interruption in a data flow switch procedure.

According to a first aspect, a data processing method is provided, where the method includes:

A first access network device receives an end marker message from a core network element, where the end marker message includes indication information, the indication information is used to indicate a first data flow on which the end marker message works in a first session, and the first data flow is a data flow switched from the first access network device to a second access network device;

the first access network device determines, based on the indication information, that the end marker message works on the first data flow; and when the first access network device receives a second data packet of a second data flow after receiving the end marker message, the first access network device sends the second data packet to a terminal device, where the second data flow is a data flow kept on the first access network device.

According to this solution, the first access network device can distinguish, based on the indication information included in the end marker message, a data flow on which the end marker message works, and after receiving the end marker message, the first access network device continues to send a data packet of the second data flow kept on the first access network device to the terminal device without discarding the data packet of the second data flow. This avoids a transmission interruption of the second data flow, and ensures service continuity.

In addition, if the first access network device receives a first data packet of the first data flow after receiving the end marker message, the first access network device discards the first data packet.

In another description manner of the data processing method in the first aspect, the method includes:

A first access network device receives an end marker message from a core network element, where the end marker message includes indication information, the indication information is used to indicate a data flow on which the end marker message works, and the data flow on which the end marker message works is a first data flow switched from the first access network device to a second access network device in a first session; and the first access network device determines, based on the indication information, that the end marker message works on the first data flow, so that the first access network device does not discard a data packet of a second data flow that is in the first session and that is kept on the first access network device.

In another description manner of the data flow on which the end marker message works in the first aspect, the data flow on which the end marker message works may alternatively be expressed as a data flow corresponding to the end marker message or a data flow associated with the end marker message. It may be understood that the end marker message affects the data flow on which the end marker message works, that corresponds to the end marker message, or that is associated with the end marker message.

In a possible implementation, the method further includes:

the first access network device forwards a data packet of the first data flow to the second access network device; and when the first access network device completes forwarding, to the second access network device, a data packet that is of the first data flow and that is received by the first access network device before the end marker message, the first access network device sends a second end marker message to the second access network device. The second end marker message may be the foregoing end marker message received by the first access network device. Alternatively, the second end marker message may be generated by the second access network device, and the second end marker message may include or not include the foregoing indication information.

In another possible implementation, the indication information may include an identifier of a data flow on which the end marker message works. For example, the indication information includes an identifier of the first data flow. When the end marker message works on a plurality of data flows, identifiers of the plurality of data flows may be included. In a variation of this implementation, the indication information may include an identifier of a data flow on which the end marker message does not works. For example, the indication information includes an identifier of the second data flow. The data flow on which the end marker message works may be learned based on the identifier of the data flow on which the end marker message does not works.

In another possible implementation, the indication information includes a bit sequence. A plurality of bits in the bit sequence one-to-one correspond to a plurality of data flows in the first session. A value of the bit is a first value or a second value, the first value indicates that the end marker message works on a data flow, and the second value is used to indicate that the end marker message does not works on a data flow. A value of a bit corresponding to the first data flow is the first value, and a value of a bit corresponding to the second data flow is the second value.

According to this solution, in the indication information, a correspondence is established between a plurality of bits in one field and a plurality of data flows. Compared with the foregoing implementation in which the identifier of the data flow on which the end marker message works is included in the end marker message, this manner reduces storage and transmission resources occupied by the indication information.

In another possible implementation, that the end marker message includes the indication information includes: A protocol header of the end marker message includes the indication information; or a content information element of the end marker message includes the indication information.

In another possible implementation, the first access network device is a master base station, and the second access network device is a secondary base station; or the first access network device is a secondary base station, and the second access network device is a master base station.

In another possible implementation, the core network element is a user plane function network element.

In another possible implementation, the core network element is a session management function network element.

According to a second aspect, a data processing method is provided, where the method includes:

a core network element obtains an end marker message, where the end marker message includes indication information, the indication information is used to indicate a first data flow on which the end marker message works in a first session, and the first data flow is a data flow switched from a first access network device to a second access network device; and the core network element sends the end marker message to the first access network device.

According to this solution, the core network element sends the end marker message to the first access network device, so that the first access network device can distinguish, based on the indication information included in the end marker message, a data flow on which the end marker works, and after receiving the end marker message, the first access network device continues to send a data packet of a second data flow kept on the first access network device to a terminal device without discarding the data packet of the second data flow. This avoids a transmission interruption of the second data flow, and ensures service continuity.

In another description manner of the data flow on which the end marker message works in the second aspect, the data flow on which the end marker message works may alternatively be expressed as a data flow corresponding to the end marker message or a data flow associated with the end marker message. It may be understood that the end marker message affects the data flow on which the end marker message works, that corresponds to the end marker message, or that is associated with the end marker message.

In a possible implementation, that the core network element obtains the end marker message includes: The core network element generates the end marker message; or the core network element receives the end marker message from a control network element. For example, the core network element may be a user plane function network element, and the control network element may be a session management function network element.

In another possible implementation, the method further includes: After sending the end marker message, the core network element continues to send a second data packet of the second data flow in the first session to the first access network device, where the second data flow is a data flow kept on the first access network device.

In another possible implementation, the indication information may include an identifier of a data flow on which the end marker message works. For example, the indication information includes an identifier of the first data flow. When the end marker message works on a plurality of data flows, identifiers of the plurality of data flows may be included. In a variation of this implementation, the indication information may include an identifier of a data flow on which the end marker message does not works. For example, the indication information includes an identifier of the second data flow. The data flow on which the end marker message works may be learned based on the identifier of the data flow on which the end marker message does not works.

In another possible implementation, the indication information includes a bit sequence. A plurality of bits in the bit sequence one-to-one correspond to a plurality of data flows in the first session. A value of the bit is a first value or a second value, the first value indicates that the end marker message works on a data flow, and the second value is used to indicate that the end marker message does not works on a data flow. A value of a bit corresponding to the first data flow is the first value, and a value of a bit corresponding to the second data flow is the second value.

According to this solution, in the indication information, a correspondence is established between a plurality of bits in one field and a plurality of data flows. Compared with the foregoing implementation in which the identifier of the data flow on which the end marker message works is included in the end marker message, this manner reduces storage and transmission resources occupied by the indication information.

In another possible implementation, that the end marker message includes the indication information includes: A protocol header of the end marker message includes the indication information; or a content information element of the end marker message includes the indication information.

In another possible implementation, the first access network device is a master base station, and the second access network device is a secondary base station; or the first access network device is a secondary base station, and the second access network device is a master base station.

For specific descriptions of the implementations listed in the second aspect, refer to related content in the first aspect. Other implementations in the first aspect are also applicable to the second aspect.

According to a third aspect, a data processing method is provided, where the method includes:

a first access network device sends indication information to a first core network element, where the indication information is used to indicate a to-be-switched first data flow in a first session;

the first access network device receives an end marker message from a second core network element;

the first access network device determines, based on the first data flow, that the end marker message works on the first data flow; and when the first access network device receives a second data packet of a second data flow in the first session after receiving the end marker message, the first access network device sends the second data packet to a terminal device, where the second data flow is a data flow kept on the first access network device.

In another description of the method in the third aspect, the method includes:

a first access network device receives indication information from a first core network element, where the indication information is used to indicate a first data flow that is in a first session and that is switched from the first access network device;

the first access network device determines, based on the first data flow, that the end marker message works on the first data flow; and when the first access network device receives a second data packet of a second data flow in the first session after receiving the end marker message, the first access network device sends the second data packet to a terminal device, where the second data flow is a data flow kept on the first access network device.

According to this solution, the first access network device can correctly distinguish, based on the learned data flow that is switched from the first access network device, the data flow on which the end marker message works, and after receiving the end marker message, the first access network device continues to send a data packet of the second data flow kept on the first access network device to the terminal device without discarding the data packet of the second data flow. This avoids a transmission interruption of the second data flow, and ensures service continuity.

The first access network device may learn, in a data flow switch procedure, the data flow switched from the first access network device, and a specific learning manner is not limited.

In addition, if the first access network device receives a first data packet of the first data flow after receiving the end marker message, the first access network device discards the first data packet.

In another description manner of the data flow on which the end marker message works in the third aspect, the data flow on which the end marker message works may alternatively be expressed as a data flow corresponding to the end marker message or a data flow associated with the end marker message. It may be understood that the end marker message affects the data flow on which the end marker message works, that corresponds to the end marker message, or that is associated with the end marker message.

In a possible implementation, the end marker message includes second indication information, and the second indication information is used to indicate that the end marker message works on a part of data flows in the first session. The first access network device may learn, based on the second indication information, that the end marker message is not used for all data flows of the first session. Therefore, the first access network device may determine, based on the second indication information, that the end marker message works on the first data flow.

In a possible implementation, the end marker message includes second indication information, and the second indication information is used to indicate a data flow switch scenario. The data flow switch scenario means that the end marker message works on a part of data flows in the first session instead of all data flows in the first session. Therefore, the first access network device may use, based on the second indication information, the data flow switched from the first access network device as the data flow on which the end marker message works.

In another possible implementation, the first access network device is a master base station, and a second access network device is a secondary base station; or the first access network device is a secondary base station, and a second access network device is a master base station.

In another possible implementation, the first core network element is a session management function network element, and the second core network element is a user plane function network element.

In another possible implementation, the first core network element is an access and mobility management function network element, and the second core network element is a user plane function network element.

For specific descriptions of the implementations listed in the third aspect, refer to related content in the first aspect. Other implementations in the first aspect are also applicable to the third aspect.

According to a fourth aspect, an access network apparatus is provided, and is configured to implement the method in the first aspect. The access network apparatus may be the first access network device in the first aspect, or an apparatus including the first access network device. The access network apparatus includes a corresponding module, unit, or means (means) for implementing the foregoing method. The module, unit, or means may be implemented by hardware, implemented by software, or implemented by hardware executing corresponding software. The hardware or the software includes one or more modules or units corresponding to the foregoing functions.

According to a fifth aspect, a core network apparatus is provided, and is configured to implement the method in the second aspect. The core network apparatus may be the core network element in the second aspect, or an apparatus including the core network element. The core network apparatus includes a corresponding module, unit, or means (means) for implementing the foregoing method. The module, unit, or means may be implemented by hardware, implemented by software, or implemented by hardware executing corresponding software. The hardware or the software includes one or more modules or units corresponding to the foregoing functions.

According to a sixth aspect, an access network apparatus is provided, and is configured to implement the method in the third aspect. The access network apparatus may be the first access network device in the third aspect, or an apparatus including the first access network device. The access network apparatus includes a corresponding module, unit, or means (means) for implementing the foregoing method. The module, unit, or means may be implemented by hardware, implemented by software, or implemented by hardware executing corresponding software. The hardware or the software includes one or more modules or units corresponding to the foregoing functions.

According to a seventh aspect, an access network apparatus is provided, where the apparatus includes:

a processor, where the processor is configured to read and run instructions in a memory, to implement the method provided in the first aspect.

Optionally, the access network apparatus may include the memory. Optionally, the access network apparatus may be a base station or a chip.

According to an eighth aspect, a core network apparatus is provided, where the apparatus includes:

a processor, where the processor is configured to read and run instructions in a memory, to implement the method provided in the second aspect.

Optionally, the core network apparatus may include the memory. Optionally, the core network apparatus may be a core network element or a chip.

According to a ninth aspect, an access network apparatus is provided, where the apparatus includes:

a processor, where the processor is configured to read and run instructions in a memory, to implement the method provided in the third aspect.

Optionally, the access network apparatus may include the memory. Optionally, the access network apparatus may be a base station or a chip.

According to a tenth aspect, a computer storage medium is provided, where the computer storage medium includes instructions. When the instructions are run on the foregoing access network apparatus or the foregoing core network apparatus, the apparatus is enabled to implement any one of the foregoing methods.

According to an eleventh aspect, an embodiment of this application provides a computer program product, including instructions. When the instructions are run on the foregoing access network apparatus or the foregoing core network apparatus, the apparatus is enabled to implement any one of the foregoing methods.

According to a twelfth aspect, a communications system is provided, where the communications system includes the access network apparatus according to the fourth aspect or the seventh aspect and the core network apparatus according to the fifth aspect or the eighth aspect.

According to a thirteenth aspect, a communications system is provided, where the communications system includes the access network apparatus according to the sixth aspect or the ninth aspect. Optionally, the communications system may further include a user plane function network element. Optionally, the communications system may further include an access and mobility management function network element or a session management function network element.

For beneficial effects of the fourth to thirteenth aspects provided in this application, refer to related content in the first to third aspects.

BRIEF DESCRIPTION OF DRAWINGS

FIG. 4 is a schematic diagram of a protocol header of an end marker (end marker) message according to an embodiment of this application;

FIG. 5 is a schematic diagram of a protocol header of another end marker message according to an embodiment of this application:

FIG. 6 is a schematic diagram of a content information element of an end marker message according to an embodiment of this application;

FIG. 7 is a schematic diagram of a content information element of another end marker message according to an embodiment of this application;

FIG. 9 is a schematic diagram of a protocol header of still another end marker message according to an embodiment of this application;

DESCRIPTION OF EMBODIMENTS

To make the objectives, technical solutions, and advantages of the embodiments of this application clearer, the following describes the technical solutions in the embodiments of this application with reference to the accompanying drawings in the embodiments of this application.

In the embodiments of this application, the technical solutions are described based on a 5G communications system. A person skilled in the art should learn that, with evolution and change of communications technologies, the solutions in this application are also applicable to other communications systems, such as a 6G communications system. This is not limited in the embodiments of this application.

For ease of description, Table 1 lists English abbreviations and English full names in this application.

TABLE 1

| English abbreviation | English full name |
| --- | --- |
| 5GC | 5G core network |
| RAN | radio access network |
| AMF | access and mobility management function |
| SMF | session management function |
| UPF | user plane function |
| PCF | policy control function |
| AUSF | authentication server function |
| UDM | unified data management |
| NSSF | network slice selection function |
| AF | application function |
| DN | data network |
| UE | user equipment |
| SM | session management |
| IP | internet protocol |
| QoS | quality of service |
| QoS flow | quality of service flow |
| PDU | packet data unit |
| PDU session | packet data unit session |
| QFI | quality of service flow identifier |
| DC | dual-connectivity |
|  | end marker |
| PDU Session ID | packet data unit identifier |
| AN Tunnel Info | access node tunnel information |
| NG-U | next generation user plane interface |
| NG-RAN | next generation radio access network |
| NG-U Tunnel | next generation user plane interface tunnel |
| GTP-U | GPRS Tunneling Protocol-User Plane |
| G-PDU | GPRS Tunneling protocol-packet data unit |
| T-PDU | tunneled packet data unit |
|  | Radio |
| RB | Radio Bearer |
| gNB | gNodeB |
| eNB | evolved NodeB |

TABLE 1-continued

| English abbreviation | English full name |
| --- | --- |
| RNC | radio network controller |
| NB | NodeB |
| BSC | base station controller |
| BTS | base transceiver station |
| BBU | baseband unit |
| TRP | transmitting and receiving point |
| TP | transmitting point |
| VR | virtual reality |
| AR | augmented reality |
| RRC | radio resource control |
| PDCP | packet data convergence protocol |

Figure 1:
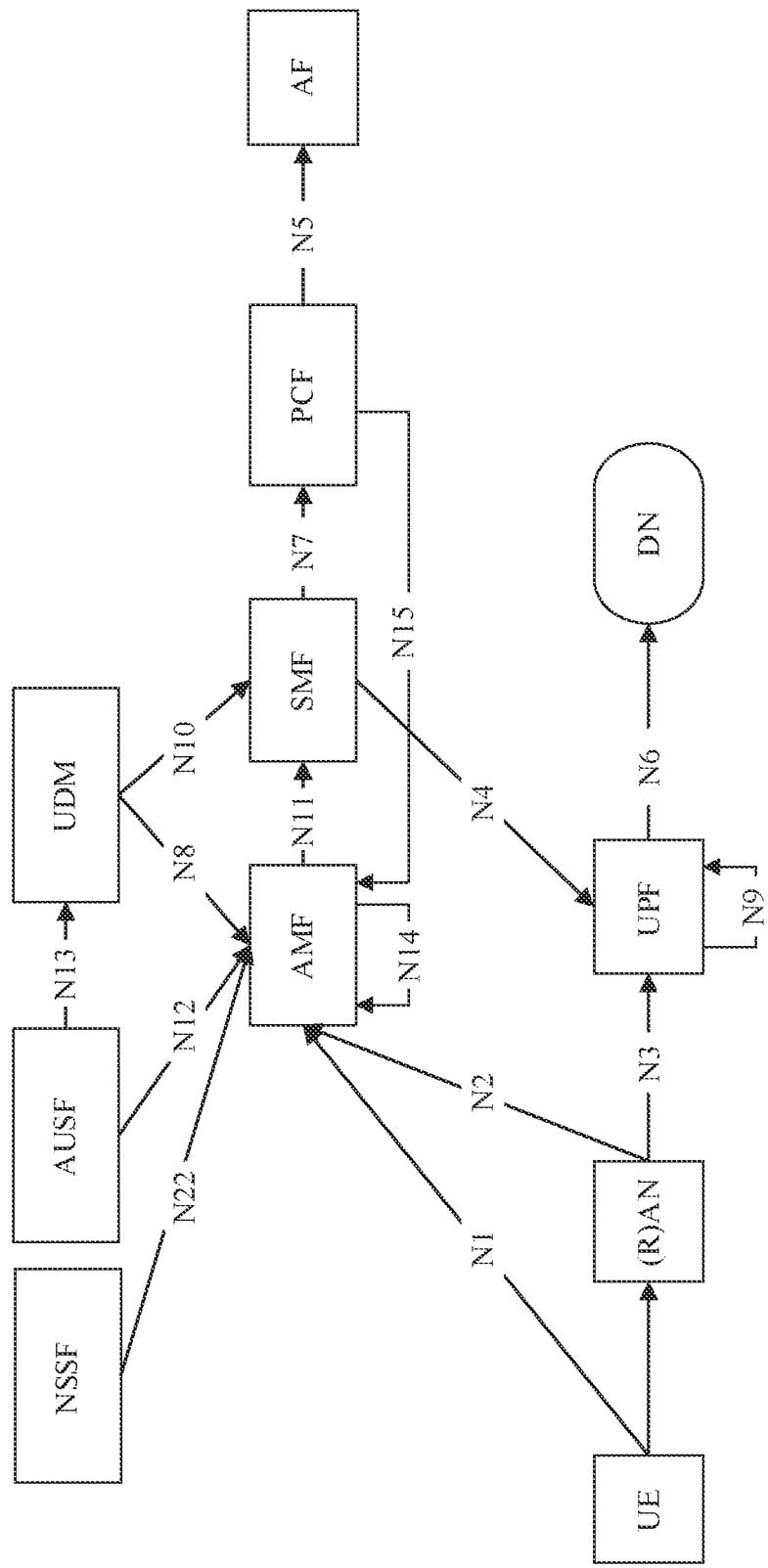
FIG. 1 is a schematic diagram of an architecture of a 5G communications system according to an embodiment of this application.

FIG. 1 is a schematic diagram of an architecture of a 5G communications system. The communications system includes a core network part and an access network part. An access network may also be referred to as a radio access network RAN. A core network may include an AMF network element, an SMF network element, a UPF network element, a PCF network element, an AUSF network element, a UDM network element, and an NSSF network element. An AF network element may be connected to the PCF, to provide an application service. The UPF may be connected to a DN. UE may access the DN through the communications system.

The AMF network element is a network element used for access and mobility management. The network element is mainly used for access control, mobility management, attach and detach, and SMF network element selection. The network element may serve as an anchor of a signaling connection between N1 and N2, to provide a route of an N1/N2 SM message for the SMF.

The SMF network element is a network element used for session management. The network element is mainly used for providing control-plane functions for session management, such as session creation, modification, and release. The network element may assign an IP address to a UE and select and redirect a UPF network element.

The UPF network element is a network element used for user plane processing. The network element is mainly used for processing a user plane service, for example, data packet routing and forwarding, and QoS mapping and execution. The network element may receive user data from the DN, and transmit the user data to the UE through an access network device. The network element may further receive user data from the UE through the access network device, and forward the user data to the DN. The SMF network element manages and controls a transmission resource and a scheduling function of the network element that are used for providing a service for the UE.

The PCF network element is a network element used for policy control. The network element is mainly used for providing a unified policy framework to manage network behaviors and providing a policy rule for a control layer network function, and is responsible for obtaining policy-related subscription information of a subscriber.

The AUSF network element is a network element used for authentication. The network element works on access authentication.

The UDM network element is a network element used for data management. The network element is mainly used for generating an authentication parameter, storing and managing an ID of a permanent user in a system, and performing registration management on network elements serving the user, for example, an AMF and an SMF that currently provide a service for a terminal device.

The NSSF network element is a network element used for selecting a network slice. The network element is mainly used for determining a network slice instance that is allowed to be accessed by the UE.

The access network device is a device that provides a wireless communication function for the terminal device. The access network device includes but is not limited to an evolved NodeB (evolved NodeB, eNB), a radio network controller (radio network controller, RNC), a NodeB (NodeB, NB), a donor eNodeB (donor evolved NodeB, DeNB), a base station controller (base station controller, BSC), a base transceiver station (base transceiver station, BTS), a home NodeB (for example, a home evolved NodeB or a home NodeB, HNB), a baseband unit (baseband unit, BBU), an access point (access point, AP), a wireless relay node, a wireless backhaul node, a transmission point (transmission point, TP), or a transmission and reception point (transmission and reception point, TRP) in a wireless fidelity (wireless fidelity, Wi-Fi) system, or the like. The access network device may alternatively be a next generation NB (generation, gNB) or a transmission point (for example, a TRP or a TP) in a 5G system, for example, a new radio (new radio, NR) system, or one antenna panel or a group of antenna panels (including a plurality of antenna panels) of a base station in a 5G system, or may be a network node, for example, a BBU or a distributed unit (distributed unit, DU), that constitutes a gNB or a transmission point.

In some deployments, the gNB may include a centralized unit (centralized unit, CU) and a DU. The gNB may further include a radio unit (radio unit, RU). The CU implements a part of functions of the gNB, and the DU implements a part of functions of the gNB. For example, the CU implements functions of an RRC layer and a PDCP layer, and the DU implements functions of an RLC layer, a MAC layer, and a PHY layer. Information at the RRC layer eventually becomes information at the PHY layer, or is converted from information at the PHY layer. Therefore, in this architecture, higher layer signaling, for example, RRC layer signaling or PDCP layer signaling, may also be considered as being sent by the DU or sent by the DU and the RU. It may be understood that the access network device may be a CU node, a DU node, or a device including a CU node and a DU node. In addition, the CU may be classified as a network device in an access network, or the CU may be classified as a network device in a core network (core network, CN). This is not limited herein.

The AF network element is a network element used for an application service. The network element is mainly used for interacting with a 3GPP core network to provide a service, for example, to affect a data routing decision, interact with a policy control function, or provide some services of a third party to a network side.

The DN is a data network. The DN is mainly used for providing services for users, such as an operator's service, an internet access service, and a third-party service.

The terminal device is a device having a wireless transceiving function, and is referred to as UE in the embodiments of this application. The terminal device may be deployed on land, including an indoor device, an outdoor device, a handheld device, or a vehicle-mounted device, or may be deployed on a water surface (for example, on a ship), or may be deployed in the air (for example, on an aircraft, a balloon, or a satellite). The terminal device may be a mobile phone, a tablet computer, a computer having a wireless transceiving function, a VR terminal, an AR terminal, a wireless terminal in industrial control, a wireless terminal in self-driving, a wireless terminal in telemedicine, a wireless terminal in a smart grid, a wireless terminal in transportation security, a wireless terminal in a smart city, a wireless terminal in a smart home, or the like.

The access network device is connected to the UPF through a user plane interface N3, and is configured to transmit data of the UE. The access network device establishes a control plane signaling connection to the AMF through a control plane interface N2. The AMF establishes a signaling connection to the UE through an N1 interface. The AMF is connected to the SMF through an N11 interface. The AMF serves as an anchor of a signaling connection between N1 and N2, to provide a route of an N1 or N2 SM message for the SMF. The UPF is connected to the SMF through an N4 interface.

Figure 2:
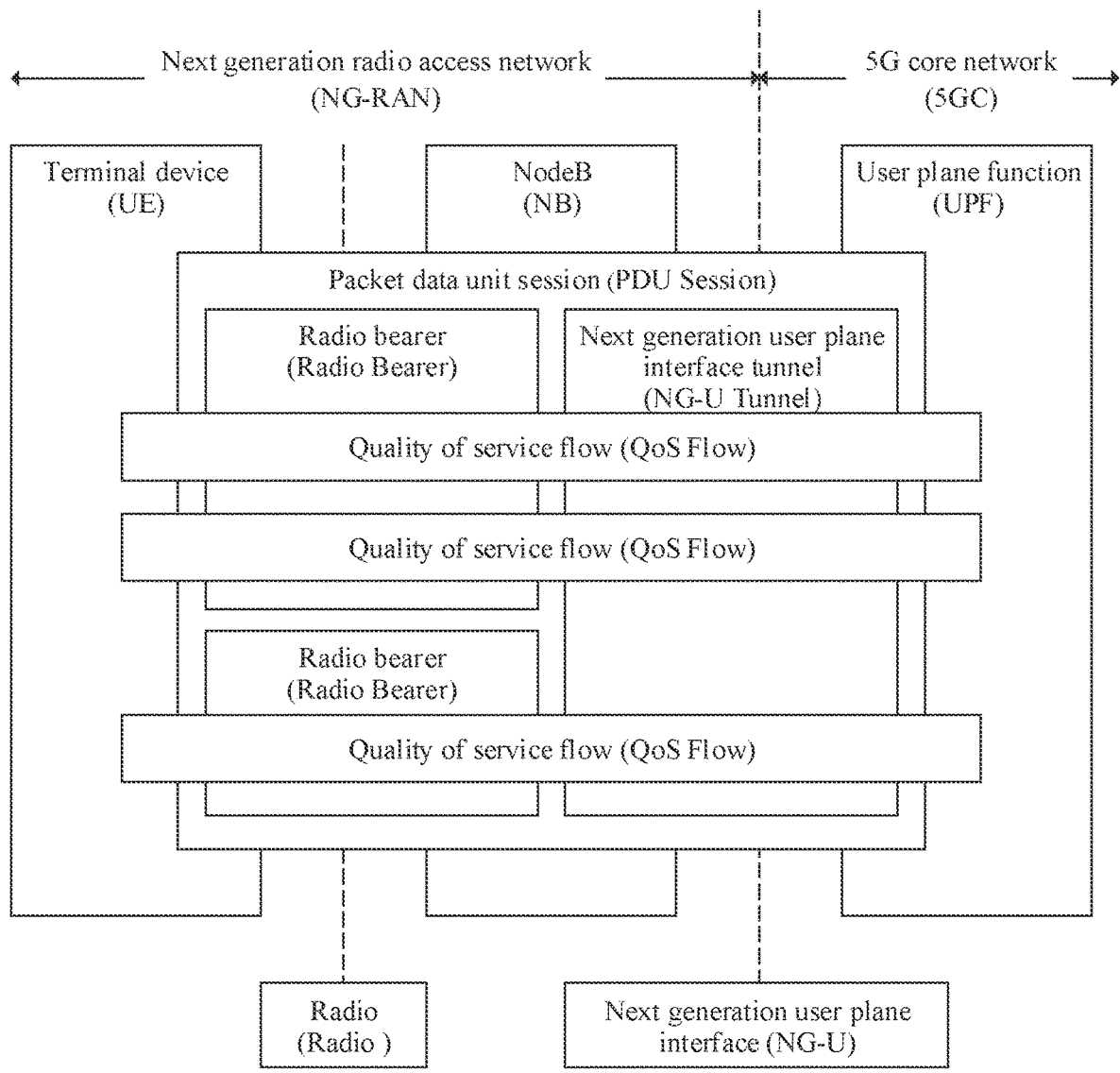
FIG. 2 is a schematic diagram of a QoS flow transmission method according to an embodiment of this application.

A session in the embodiments of this application may be a PDU session in a 5G network. A data flow in the embodiments of this application may be a QoS flow in the 5G network. In the 5G network, one UE may simultaneously create a plurality of PDU sessions to access a same DN or different DNs, and access one DN by using each PDU session. Establishment of one PDU session means establishment of one data transmission channel between the UE and the DN. A minimum QoS differentiation granularity in a PDU session is a QoS flow. One PDU session may include a plurality of QoS flows. One QFI identifies one QoS flow, and the identifier is unique in each PDU session. A QoS flow is transmitted on a per data packet basis. Packets in a same QoS flow have a same QoS guarantee (such as a packet delay, a packet error rate, and a priority). Different QoS guarantees need to be provided by different QoS flows. As shown in FIG. 2, one QoS flow can be mapped to one radio bearer, and one radio bearer can carry one or more QoS flows. In a single connection scenario in which UE establishes a PDU session through one access network device, one PDU session uses one N3 tunnel, and a plurality of QoS flows in the PDU session share the N3 tunnel. Optionally, the N3 tunnel may be an NG-U tunnel. The tunnel uses a GTP-U protocol. The protocol is used to provide a data packet transmission and reception service for a user plane entity. The tunnel can be used to transmit a G-PDU message that includes a GTP-U protocol header and a T-PDU, or transmit a GTP-U signaling message that includes a GTP-U protocol header and an information element. The T-PDU includes a user data packet, and the data packet may be an IP datagram.

One UE may receive signals of a plurality of access network devices having different frequency bands and strengths. One UE can simultaneously send or receive data to or from a plurality of access network devices. This is referred to as multi-connectivity. One UE simultaneously establishes connections to two access network devices, and sends or receives data through the two connections. This may be referred to as dual-connectivity. A person skilled in the art should learn that a technical solution applicable to a dual-connectivity scenario is also applicable to a multi-connectivity scenario. A part of QoS flows in a PDU session of the UE may be switched from a first access network device to a second access network device, and a part of QoS flows in the session are kept on the first access network device, so that the QoS flows of the PDU session can be offloaded to the two access network devices. Optionally, the first access network device may be a master access network device, and the second access network device may be a secondary access network device. Optionally, the first access network device may be a secondary access network device, and the second access network device may be a master access network device. In the embodiments of this application, an example in which the first access network device is a master access network device and the second access network device is a secondary access network device works on description. For ease of description, the master access network device is represented by an M-RAN node, and the secondary access network device is represented by an S-RAN node.

Based on the foregoing 5G communications system, this application provides a plurality of embodiments to describe in detail the technical solutions of this application.

Embodiment 1

Figure 3A:
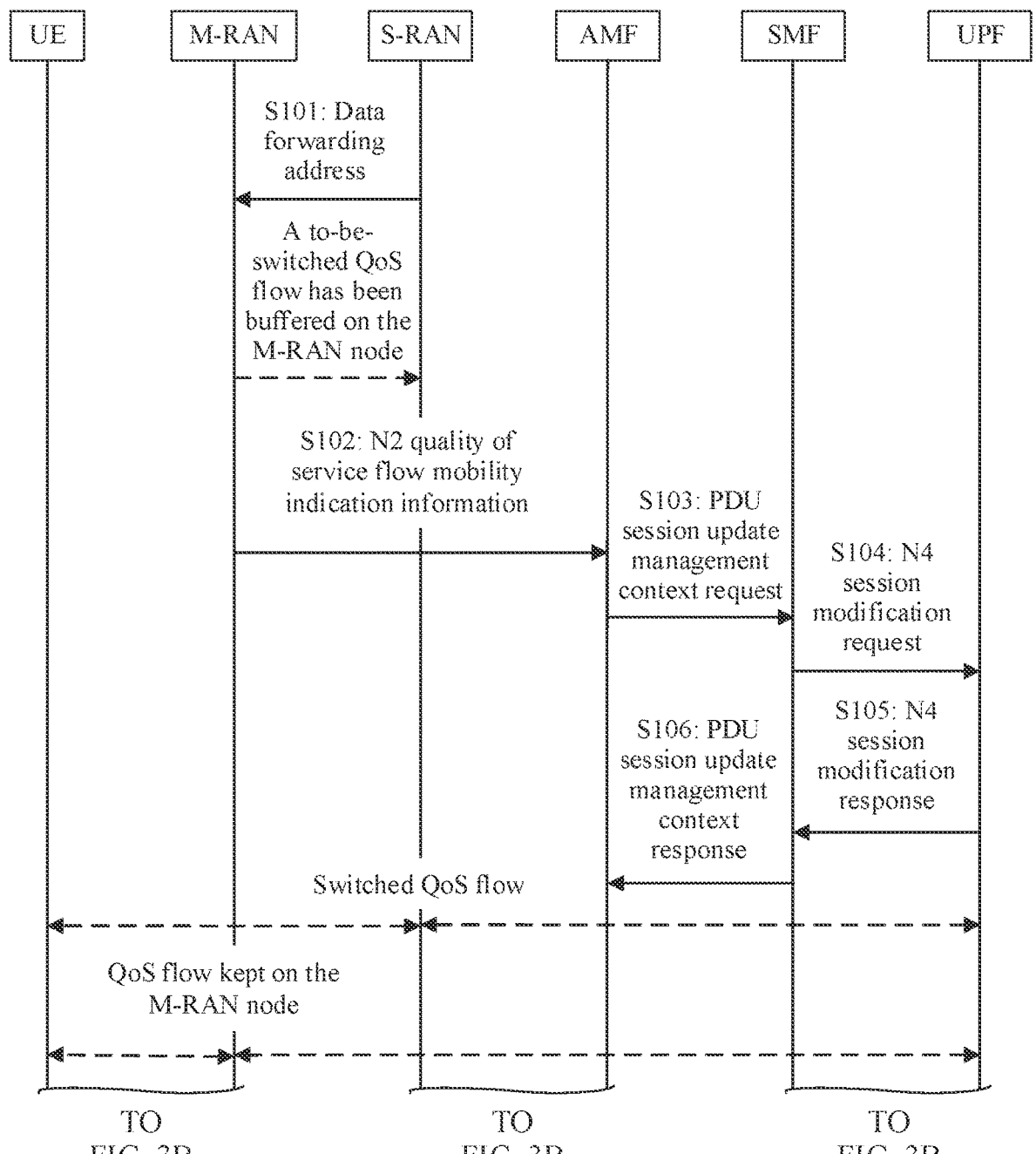
FIG. 3A and FIG. 3B are a flowchart of a data processing method according to an embodiment of this application.
Figure 3B:
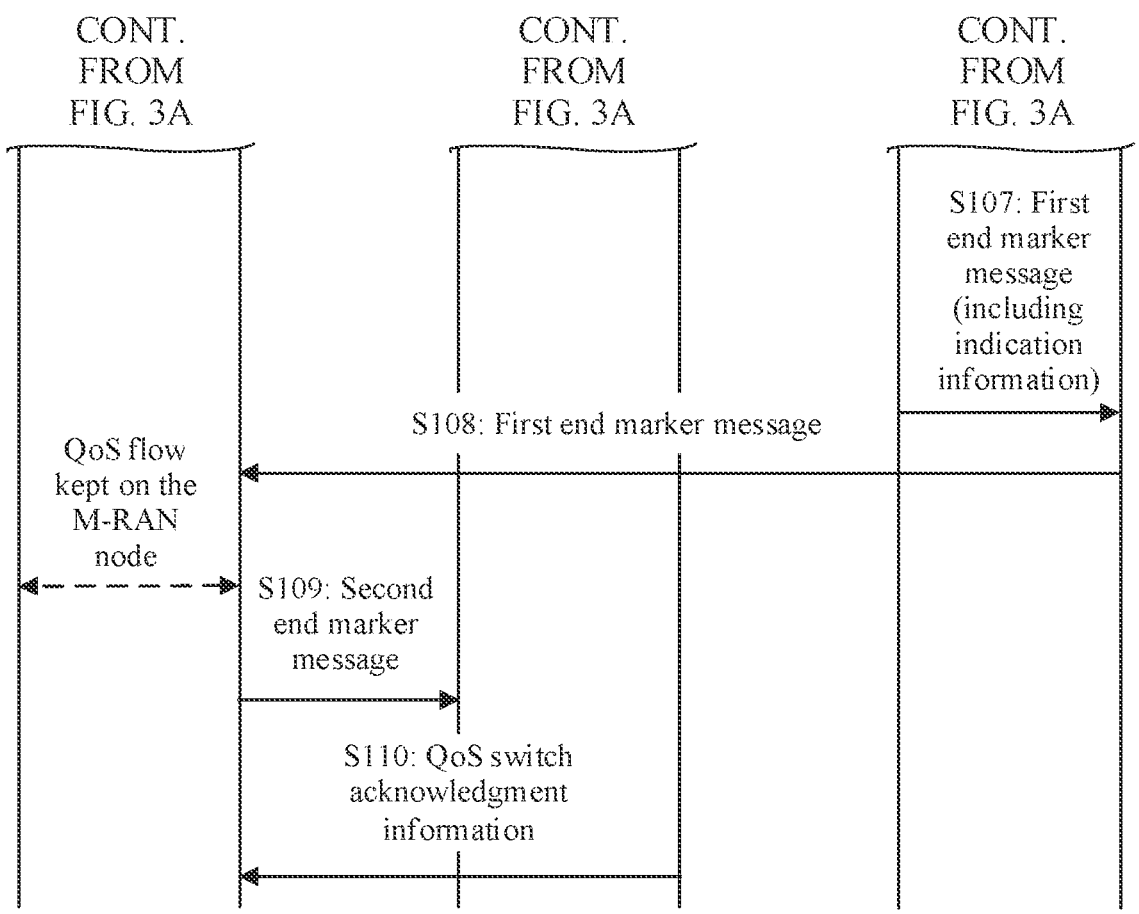

Embodiment 1 describes a QoS flow switch procedure in a dual-connectivity scenario. After establishing dual-connectivity, UE may switch, from an M-RAN node to an S-RAN node according to the QoS flow switch procedure, a part of QoS flows in a PDU session carried on the M-RAN node. In this process, an SMF or a UPF generates an end marker message to be sent to the M-RAN node. As shown in FIG. 3A and FIG. 3B, the following steps are included.

S101: The S-RAN node sends a data forwarding address to the M-RAN node.

The M-RAN may forward data to the S-RAN based on the forwarding address.

Optionally, the M-RAN node may forward, to the S-RAN node, a data packet that is buffered on the M-RAN node and that is of a QoS flow switched from the M-RAN node to the S-RAN node in the PDU session. In addition, the M-RAN node may send a data packet of a QoS flow kept on the M-RAN to the UE.

In this embodiment of this application, the M-RAN node may be considered as a source node, and the S-RAN node may be considered as a target node.

S102: The M-RAN node sends N2 quality of service flow mobility indication (N2 QoS Flow mobility Indication) information to an AMF.

As an alternative, the S102 part may be as follows: The M-RAN node may send PDU session resource modify indication (PDU SESSION RESOURCE MODIFY INDICATION) information to the AMF.

The foregoing two types of indication information may include a PDU Session ID, QFI(s), and AN Tunnel Info. The PDU Session ID is used to indicate a PDU session in which a to-be-switched QoS flow is located. The QFI(s) is used to indicate the to-be-switched QoS flow. The AN Tunnel Info is used to indicate a downlink tunnel endpoint of the S-RAN node.

In an example, UE A establishes two PDU sessions in a 5G communications system: PSession #1 and PSession #2. PSession #1 includes two QoS flows: Qflow #1-1 and Qflow #1-2. PSession #2 includes four QoS flows: Qflow #2-1, Qflow #2-2, Qflow #2-3, and Qflow #2-4. IDs of the PDU sessions and the QoS flows are shown in Table 2.

TABLE 2

| PDU session: | QoS flow: | QoS Flow ID (QFI): |
| --- | --- | --- |
| PSession#1 | Qflow#1-1 | 00000001 |
|  | Qflow#1-2 | 00000010 |
| PSession#2 | Qflow#2-1 | 00000001 |
|  | Qflow#2-2 | 00000010 |
|  | Qflow#2-3 | 00000011 |
|  | Qflow#2-4 | 00000100 |

It is assumed that Qflow #2-1 and Qflow #2-2 of the UE A need to be switched to the S-RAN node, and the AN Tunnel Info of the S-RAN node is TInfo #02. In the N2 quality of service flow mobility indication information, the PDU Session ID is 010, the QFIs are 00000001 and 00000010, and the AN Tunnel Info is TInfo #02.

For ease of description, the following steps in Embodiment 1 are illustrated based on the foregoing example.

S103: The AMF sends a PDU session update management context request (Nsmf_PDUSession_UpdateSMContext request) to the SMF.

The request includes the PDU Session ID, the QFI(s), and the AN Tunnel Info.

S104: The SMF sends an N4 session modification request (N4 Session Modification Request) to the UPF.

The request includes the QFI(s), the AN Tunnel Info, and an identifier that is used to indicate PDU session information. The identifier may be an N4 interface session endpoint identifier (Session Endpoint Identifier), an N4 interface session identifier (N4 Session ID), or the PDU Session ID. An N4 interface is an interface between the SMF and the UPF.

Specifically, after receiving the N4 session modification request, the UPF switches the to-be-switched QoS flow to the S-RAN node.

S105: After switching the to-be-switched QoS flow, the UPF sends an N4 session modification response (N4 Session Modification Response) to the SMF.

S106: The SMF sends a PDU session update management context response (Nsmf_PDUSession_UpdateSMContext response) to the AMF.

Optionally, after switching the to-be-switched QoS flow to the S-RAN node, the UPF may send the data packet of the switched QoS flow to the S-RAN node. At the same time, the UPF may send the data packet of the QoS flow kept on the M-RAN node to the M-RAN node.

S107: The SMF sends a first end marker message to the UPF.

In an example, after receiving the N4 session modification response from the UPF, the SMF learns that the to-be-switched QoS flow has been switched to the S-RAN, and the SMF may send the first end marker message to the UPF.

The first end marker message is generated by the SMF. The first end marker message includes indication information. The indication information is used to indicate a QoS flow corresponding to the first end marker message (that is, a QoS flow on which the end marker message works), where the QoS flow is the QoS flow switched from the M-RAN to the S-RAN in the dual-connectivity scenario. Optionally, the first end marker message may correspond to one or more QoS flows switched from the M-RAN to the S-RAN.

In this embodiment of this application, a data flow corresponding to the end marker message and a data flow on which the end marker message works indicate a same meaning, and both mean that the data flow is affected by the end marker message.

Optionally, the first end marker message may alternatively be generated by the UPF. In this case, S107 may be expressed as: The UPF generates the first end marker message.

As an optional understanding, carrying the indication information in the end marker message may be considered as that the end marker message works on the QoS flow indicated by the indication information, but is not used for another QoS flow in the PDU session.

In S107, the QoS flow indicated by the indication information may be a switched QoS flow.

S108: The UPF sends the first end marker message to the M-RAN node.

Specifically, the M-RAN node learns, based on the indication information in the first end marker message, that QoS flows on which the first end marker message works in the PDU session are switched QoS flows, for example, Qflow #2-1 and Qflow #2-2, and another QoS flow in the PDU session is a QoS flow kept on the M-RAN node, which is referred to as a kept QoS flow.

After receiving the first end marker message, the M-RAN node may receive the data packet of the switched QoS flow or the data packet of the kept QoS flow. Because the M-RAN node learns the QoS flow on which the first end marker message works, the M-RAN node may perform different processing on data packets of different QoS flows, as shown in S108a and S108b (which are not shown in FIG. 3A and FIG. 3B).

S108a: The M-RAN node discards the data packet that is of the switched QoS flow and that is received after the first end marker message.

After learning the QoS flow on which the first end marker message works, the M-RAN node may discard the data packet that is received after the first end marker message and that is of the switched QoS flow on which the first end marker message works.

S108b: The M-RAN node continues to send the data packet of the kept data flow to a terminal device.

After learning the QoS flow on which the first end marker message works, the M-RAN node can correctly distinguish a QoS flow for which the first end marker message is not used. The M-RAN node may not discard a data packet that is received after the first end marker message and that is of the QoS flow for which the first end marker message is not used. In other words, the M-RAN node may continue to send, to the UE, the data packet that is received after the first end marker message and that is of the QoS flow for which the first end marker message is not used.

In this embodiment of this application, for ease of description, a data flow switched from the first access network device to the second access network device is briefly referred to as a data flow that has been switched or a switched data flow, and a data flow kept on the first access network device (that is, a data flow that is not switched from the first access network device to the second access network device) is briefly referred to as a data flow that is not switched or a kept data flow.

Optionally, the UPF may send a plurality of first end marker messages to the M-RAN node, so that the M-RAN node can correctly receive the first end marker message.

S109: The M-RAN node sends a second end marker message to the S-RAN node.

In an example, after forwarding the data packet of the switched QoS flow to the S-RAN node is completed, the M-RAN node may send the second end marker message to the S-RAN node.

Optionally, the second end marker message may be the first end marker message that has been received by the M-RAN.

Optionally, the second end marker message may be generated by the M-RAN node, and the second end marker message may carry or not carry the indication information.

The second end marker message is used to indicate that the M-RAN node has stopped forwarding, to the S-RAN node, the data packet of the QoS flow that has been switched to the S-RAN node, and the second end marker message may assist the S-RAN node in reordering the data packet of the switched QoS flow. This ensures that the S-RAN node sends the data packet received from the M-RAN node to the UE earlier than a data packet received from the UPF.

S110: The AMF sends QoS switch acknowledgment information to the M-RAN node.

Optionally, S110 is performed at any moment after S106. This is not limited in this embodiment of this application.

In this embodiment of this application, there may be the following three optional designs for the indication information included in the first end marker message. In addition, for designs of the second end marker message, refer to the designs of the first end marker message.

First design: The indication information included in the first end marker message may be a QFI value of a switched QoS flow in the PDU session. In the first design, one piece of indication information corresponds to one QoS flow.

Second design: The indication information included in the first end marker message may be a QFI list (QFI list) including QFI values of all switched QoS flows in the PDU session, and one piece of indication information may correspond to a plurality of QoS flows.

Third design: The indication information included in the first end marker message may be a bit sequence or a bitmap (bitmap). Bits used in the bit sequence one-to-one correspond to QoS flows, and different values of the bit are used to indicate whether the first end marker message corresponds to the QoS flow.

In a first optional implementation, the first end marker message may be a GTP-U signaling message, and the indication information may be carried in a GTP-U protocol header of the first end marker message.

Based on the first design of the indication information, the GTP-U protocol header of the first end marker message includes a QFI field, and the QFI field is used as the indication information, as shown in FIG. 4. A quantity of bits occupied by the QFI field is not limited. In this embodiment, a QFI field occupying 8 bits is used as an example for description.

For example, based on the example in S102, the SMF or the UPF generates two end marker messages in S107. In a GTP-U protocol header of a generated 1$^{st}$ first end marker message, a tunnel endpoint identifier is set to a tunnel endpoint identifier 0×ABCDEF00 allocated by the M-RAN node to PSession #2, and a QFI is set to 00000001. In a protocol header of a generated 2$^{nd}$ first end marker message, a tunnel endpoint identifier is set to 0×ABCDEF00, and a QFI is set to 00000010.

In S108, the M-RAN receives the two first end marker messages, obtains values of the tunnel endpoint identifiers and the QFI fields in the protocol headers of the two first end marker messages, and learns that the two end markers are respectively used for the QoS flows Qflow #2-1 and Qflow #2-2.

Based on the second design, the GTP-U protocol header of the first end marker message includes a QFI list, and the QFI list is used as the indication information, as shown in FIG. 5. A quantity of bits occupied by the QFI list is not limited. In this embodiment, a QFI list occupying 16 bits is used as an example for description.

For example, based on the example in S102, the SMF or the UPF generates one end marker message in S107. In a GTP-U protocol header of the message, a tunnel endpoint identifier is set to a tunnel endpoint identifier 0×ABCDEF00 allocated by the M-RAN node to PSession #2, and a QFI list includes two values: 00000001 and 00000010.

In S108, the M-RAN receives the first end marker message, obtains the values included in the tunnel endpoint identifier and the QFI list in the protocol header of the first end marker message, and learns that the end marker works on the QoS flows Qflow #2-1 and Qflow #2-2.

Based on the third design, the GTP-U protocol header of the first end marker message includes a QFI field, and the QFI field is used as the indication information, as shown in FIG. 4. A quantity of bits occupied by the QFI field is not limited. In this embodiment, a QFI field occupying 8 bits is used as an example for description. The QFI field is a bit sequence. A least significant bit corresponds to a QoS flow with a smallest QFI value in the PDU session, and other bits in the bit sequence sequentially correspond to other QoS flows. If a value of a bit is 1, it indicates that the first end marker message works on a QoS flow corresponding to the bit. If a value of a bit is 0, it indicates that the first end marker message is not used for a QoS flow corresponding to the bit.

For example, based on the example in S102, the SMF generates one first end marker message in S107. In a protocol header of the data packet, a tunnel endpoint identifier is set to a tunnel endpoint identifier 0×ABCDEF00 allocated by the M-RAN node to PSession #2, and a QFI field is set to XXXX0011. There are less than eight QoS flows in PSession #2, and only four QoS flows. Therefore, four least significant bits of the QFI field are used, and four most significant bits may be used for padding (the four most significant bits are indicated by X).

In S107, the M-RAN receives the foregoing end marker message, obtains values of the tunnel endpoint identifier and the QFI field in the protocol header of the data packet, and learns that the end marker works on both Qflow #2-1 and Qflow #2-2.

In a second optional implementation, the first end marker message may be a GTP-U signaling message, and the indication information may be carried in a content information element (content information element, Content IE) of the first end marker message.

Based on the first design, the content information element of the first end marker message includes a QFI field, and the QFI field is used as the indication information, as shown in FIG. 6. A quantity of bits occupied by the QFI field is not limited.

Based on the second design, the content information element of the first end marker message includes a QFI list, and the QFI list is used as the indication information, as shown in FIG. 7. A quantity of bits occupied by the QFI list is not limited.

Based on the third design, the content information element of the first end marker message includes a QFI field, and the QFI field is used as the indication information, as shown in FIG. 6.

A person skilled in the art may learn that the first design may have a corresponding variation. For example, in the first design, the indication information included in the first end marker message may be a QFI value of a QoS flow that is not switched in the PDU session. According to the variation of the first design, the M-RAN node can also correctly distinguish a QoS flow that is in the PDU session and that has been switched to the S-RAN node.

According to S108, the M-RAN node can distinguish, based on the indication information included in the first end marker message, a QoS flow on which the end marker works in the PDU session. After learning the QoS flow on which the end marker works in the PDU session, when receiving a data packet of the QoS flow that is not switched to the S-RAN node after receiving the end marker message, the M-RAN node does not discard the data packet of the QoS flow that is not switched to the S-RAN node, and instead, sends the data packet of the QoS flow that is not switched to the S-RAN node to the UE. In this way, the data packet of the QoS flow that is not switched to the S-RAN node and that is received after the end marker message is not incorrectly discarded. This can ensure service continuity.

Embodiment 2

Figure 8:
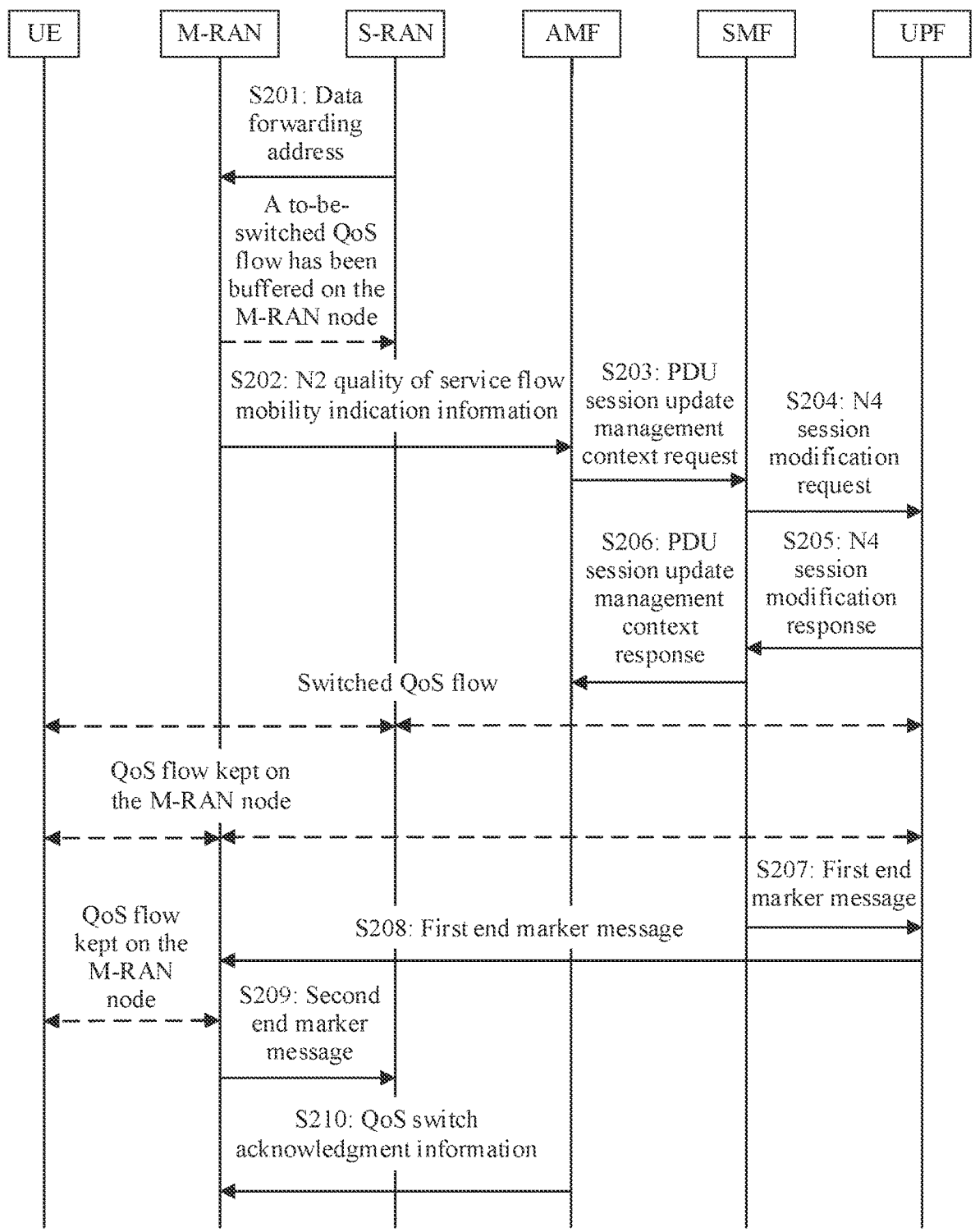
FIG. 8 is a flowchart of another data processing method according to an embodiment of this application.

Embodiment 2 describes another QoS flow switch procedure in a dual-connectivity scenario. Similar to Embodiment 1, after establishing dual-connectivity, UE may switch, from an M-RAN node to an S-RAN node according to the QoS flow switch procedure, a part of QoS flows in a PDU session carried on the M-RAN node. A difference from Embodiment 1 lies in that, an end marker message in Embodiment 2 may not include the indication information in Embodiment 1, but the M-RAN node determines, based on QoS flow information stored on the M-RAN, a QoS flow corresponding to the end marker message. As shown in FIG. 8, the following steps are included.

S201: The S-RAN node sends a data forwarding address to the M-RAN node.

For details, refer to S101.

S202: The M-RAN node sends N2 quality of service flow mobility indication information to an AMF.

For details, refer to S102.

Optionally, the M-RAN node stores the QoS flow information. The QoS flow information is used to indicate a to-be-switched QoS flow in a session. For a design of the QoS flow information, refer to the three designs of the indication information included in the first end marker message in Embodiment 1. Optionally, the QoS flow information may alternatively be stored on another network element, and the M-RAN node may obtain the QoS flow information when required.

S203: The AMF sends a PDU session update management context request to an SMF.

For details, refer to S103.

S204: The SMF sends an N4 session modification request to a UPF.

For details, refer to S104.

S205: After switching the to-be-switched QoS flow, the UPF sends an N4 session modification response to the SMF.

For details, refer to S105.

S206: The SMF sends a PDU session update management context response to the AMF.

For details, refer to S106.

S207: The SMF sends a first end marker message to the UPF.

For details, refer to S107. A difference from S107 lies in that, the first end marker message in Embodiment 2 does not include the indication information in Embodiment 1.

Optionally, the first end marker message may alternatively be generated by the UPF. In this case, S107 may be expressed as: The UPF generates the first end marker message.

Optionally, the first end marker message may include another type of indication information. The indication information is used to indicate whether the first end marker message works on all QoS flows in the PDU session. Alternatively, in the dual-connectivity scenario, it may be understood that the indication information is used to indicate that the first end marker message works on a switched data flow. A first access network device determines, based on the indication information, that the end marker message works on a data flow switched from the M-RAN node to the S-RAN node. In an example, a GTP-U protocol header of the first end marker message may include an indicator field, and the indicator field is used as the indication information, as shown in FIG. 9. A quantity of bits occupied by the indicator field is not limited. In this embodiment, an indicator field occupying 1 bit is used as an example for description. In an example, when a value of the indicator is 0, it indicates that the end marker message works on all QoS flows in the PDU session; or when a value of the indicator is 1, it indicates that the end marker message works on a part of QoS flows but not all QoS flows in the PDU session. Examples of the values of the indicator and meanings of the values of the indicator in this embodiment of this application are merely for better describing the solution, but do not constitute a limitation on the values of the indicator.

Optionally, the first end marker message may not include the indication information, that is, the first end marker message may reuse a related data structure in a communications protocol, for example, 3GPP TS 29.281 v11.6.0. After the first access network device receives the first end marker message, the M-RAN node may learn a specific switched QoS flow based on the QoS flow information stored on the M-RAN node, and use the first end marker message for the switched QoS flow.

S208: The UPF sends the first end marker message to the M-RAN node.

Specifically, the M-RAN node learns, based on the QoS flow information in S202 and the first end marker message, that the QoS flow on which the first end marker message works in the PDU session is a switched QoS flow, and another QoS flow in the PDU session is a QoS flow kept on the M-RAN node, which is referred to as a kept QoS flow.

After receiving the first end marker message, the M-RAN node may receive a data packet of the switched QoS flow or a data packet of the kept QoS flow. Because the M-RAN node learns the QoS flow on which the first end marker message works, the M-RAN node may perform different processing on data packets of different QoS flows, as shown in S208*a* and S208*b* (which are not shown in FIG. 8).

S208*a*: The M-RAN node discards the data packet that is of the switched QoS flow and that is received after the first end marker message.

After learning the QoS flow on which the first end marker message works, the M-RAN node may discard the data packet that is received after the first end marker message and that is of the switched QoS flow on which the first end marker message works.

S208*b*: The M-RAN node continues to send the data packet of the kept data flow to a terminal device.

After learning the QoS flow on which the first end marker message works, the M-RAN node can correctly distinguish a QoS flow for which the first end marker message is not used. The M-RAN node may not discard a data packet that is received after the first end marker message and that is of the QoS flow for which the first end marker message is not used. In other words, the M-RAN node may continue to send, to the UE, the data packet that is received after the first end marker message and that is of the QoS flow for which the first end marker message is not used.

In this embodiment of this application, for ease of description, a data flow switched from the first access network device to a second access network device is briefly referred to as a data flow that has been switched or a switched data flow, and a data flow kept on the first access network device (that is, a data flow that is not switched from the first access network device to the second access network device) is briefly referred to as a data flow that is not switched or a kept data flow.

Based on the example in S207, when the first end marker message includes the indication information in S207, when the value of the indicator in the GTP-U protocol header of the end marker message received by the M-RAN node is 0, the M-RAN node directly discards a data packet that is of the PDU session and that arrives after the end marker message. When the value of the indicator in the GTP-U protocol header of the end marker message received by the M-RAN node is 1, the M-RAN node learns, based on the QoS flow information in S202 and the first end marker message, the QoS flow on which the first end marker message works, and performs S208a and/or S208b.

Optionally, the UPF may send a plurality of first end marker messages to the M-RAN node, so that the M-RAN node can correctly receive the first end marker message.

S209: The M-RAN node sends a second end marker message to the S-RAN node.

For details, refer to S109.

S210: The AMF sends QoS switch acknowledgment information to the M-RAN node.

For details, refer to S110.

Optionally, S210 may be performed at any moment after S206. This is not limited in this embodiment of this application.

Optionally, the M-RAN node may store the QoS flow information after receiving the QoS switch acknowledgment information.

Based on the stored QoS flow information indicating the to-be-switched QoS flow in the session, in S208, the M-RAN node can distinguish the QoS flow that is in the PDU session and that has been switched to the S-RAN node. After learning the QoS flow that is in the PDU session and that has been switched to the S-RAN node, when receiving a data packet of the QoS flow that is not switched to the S-RAN node after receiving the end marker message, the M-RAN node does not discard the data packet of the QoS flow that is not switched to the S-RAN node, and instead, sends the data packet of the QoS flow that is not switched to the S-RAN node to the UE. In this way, the data packet of the QoS flow that is not switched to the S-RAN node and that is received after the end marker message is not incorrectly discarded. This can ensure service continuity.

Embodiment 3

Figure 10:
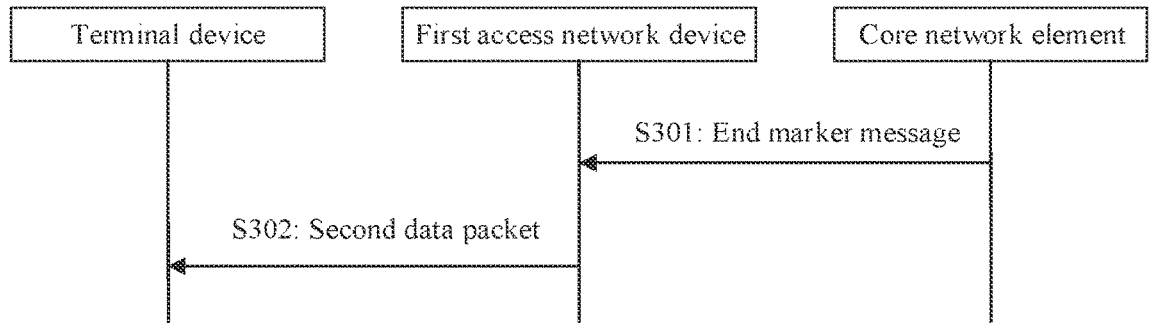
FIG. 10 is a flowchart of still another data processing method according to an embodiment of this application.

Embodiment 3 describes, from a perspective of a source node based on Embodiment 1, a data processing method provided in this embodiment of this application. As shown in FIG. 10, the method includes the following steps.

S301: A first access network device receives an end marker (end marker) message from a core network element.

The end marker message includes indication information, the indication information is used to indicate a first data flow on which the end marker message works in a first session, and the first data flow is a first data flow switched from the first access network device to a second access network device.

The first access network device may be the M-RAN node in FIG. 3A and FIG. 3B, the second access network device may be the S-RAN node in FIG. 3A and FIG. 3B, and the core network element may be the UPF in FIG. 3A and FIG. 3B. The end marker message may be the first end marker message in FIG. 3A and FIG. 3B, the first session may be the packet data unit session PDU Session in Embodiment 1, the data flow may be the QoS flow in Embodiment 1, and the first data flow may be the switched QoS flow in FIG. 3A and FIG. 3B. For a specific description, refer to Embodiment 1. Details are not described herein again.

For a related description of S301, refer to the related description of S108. Details are not described herein again.

S302: When the first access network device receives a second data packet of a second data flow in the first session after receiving the end marker message, the first access network device continues to send the second data packet to a terminal device.

The second data flow is a data flow kept on the first access network device.

The first access network device may determine, based on the indication information included in the end marker message, that the end marker message works on the first data flow. Because the end marker message works on the first data flow, the end marker message does not works on a data flow other than the first data flow in the first session.

For a related description of S302, refer to the related descriptions of S108, S108a, and S108b. Details are not described herein again.

Optionally, S302 further includes: When the first access network device receives a first data packet of the first data flow after receiving the end marker message, the first access network device discards the first data packet. For details, refer to the related description of S108a. Details are not described herein again.

Optionally, the indication information includes an identifier of the first data flow.

Optionally, the indication information includes a bit sequence. A plurality of bits in the bit sequence one-to-one correspond to a plurality of data flows in the first session. A value of the bit is a first value or a second value, the first value indicates that the end marker message works on a data flow, and the second value is used to indicate that the end marker message does not works on a data flow. A value of a bit corresponding to the first data flow is the first value, and a value of a bit corresponding to the second data flow is the second value.

For a design of the indication information, refer to the related descriptions of the designs of the indication information in Embodiment 1. Details are not described herein again.

Optionally, that the end marker message includes the indication information includes: A protocol header of the end marker message includes the indication information; or a content information element of the end marker message includes the indication information. For details, refer to the description of the implementation of the end marker message in Embodiment 1. Details are not described herein again.

In this embodiment, the first access network device can distinguish, based on the indication information included in the end marker message, a data flow that is in the first session and that has been switched to the second access network device. After learning the first data flow that is in the first session and that has been switched to the second access network device, when receiving a data packet of the second data flow that is not switched to the second access network device after receiving the end marker message, the first access network device does not discard the data packet of the second data flow, and instead, continues to send the data packet of the second data flow to the terminal device. In this way, the data packet of the second data flow that is received after the end marker message is not incorrectly discarded. This can ensure service continuity.

Embodiment 4

Figure 11:
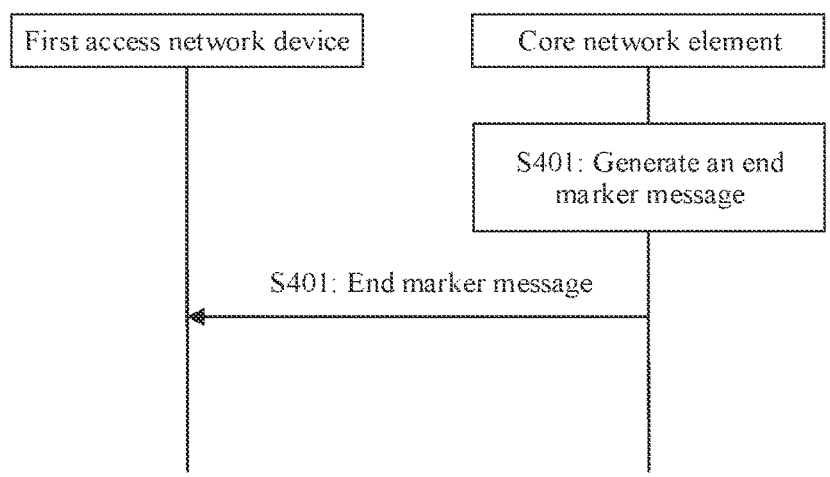
FIG. 11 is a flowchart of yet another data processing method according to an embodiment of this application.

Embodiment 4 describes, from a perspective of a core network element based on Embodiment 1, a data processing method provided in this embodiment of this application. As shown in FIG. 11, the method includes the following steps.

S401: A core network element obtains an end marker (end marker) message.

The end marker message includes indication information, the indication information is used to indicate a first data flow on which the end marker message works in a first session, and the first data flow is a first data flow switched from a first access network device to a second access network device.

The first access network device may be the M-RAN node in FIG. 3A and FIG. 3B, the second access network device may be the S-RAN node in FIG. 3A and FIG. 3B, and the core network element may be the UPF in FIG. 3A and FIG. 3B. The end marker message may be the first end marker message in FIG. 3A and FIG. 3B, the first session may be the packet data unit session PDU Session in Embodiment 1, the data flow may be the QoS flow in Embodiment 1, and the first data flow may be the switched QoS flow in FIG. 3A and FIG. 3B. For a specific description, refer to Embodiment 1. Details are not described herein again.

S402: The core network element sends the end marker message to the first access network device.

For a related description of S402, refer to the related descriptions of S108, S108a, and S108b. Details are not described herein again.

Optionally, S401 further includes: The core network element generates the end marker message; or the core network element receives the end marker message from a control network element. The control network element may be a session management function network element. For details, refer to the related description of S107. Details are not described herein again.

Optionally, S402 further includes: After sending the end marker message, the core network element continues to send a second data packet of a second data flow in the first session to the first access network device, where the second data flow is a data flow kept on the first access network device. For details, refer to the related description of S108b. Details are not described herein again.

Optionally, the indication information includes an identifier of the first data flow.

Optionally, the indication information includes a bit sequence. A plurality of bits in the bit sequence one-to-one correspond to a plurality of data flows in the first session. A value of the bit is a first value or a second value, the first value indicates that the end marker message works on a data flow, and the second value is used to indicate that the end marker message does not works on a data flow. A value of a bit corresponding to the first data flow is the first value, and a value of a bit corresponding to the second data flow is the second value.

For a design of the indication information, refer to the related descriptions of the designs of the indication information in Embodiment 1. Details are not described herein again.

Optionally, that the end marker message includes the indication information includes: A protocol header of the end marker message includes the indication information; or a content information element of the end marker message includes the indication information. For details, refer to the description of the implementation of the end marker message in Embodiment 1. Details are not described herein again.

According to this solution, the core network element sends the end marker message to the first access network device, so that the first access network device can distinguish, based on the indication information included in the end marker message, a data flow on which the end marker works, and after receiving the end marker message, the first access network device continues to send a data packet of the second data flow kept on the first access network device to a terminal device without discarding the data packet of the second data flow. This avoids a transmission interruption of the second data flow, and ensures service continuity.

Embodiment 5

Figure 12:
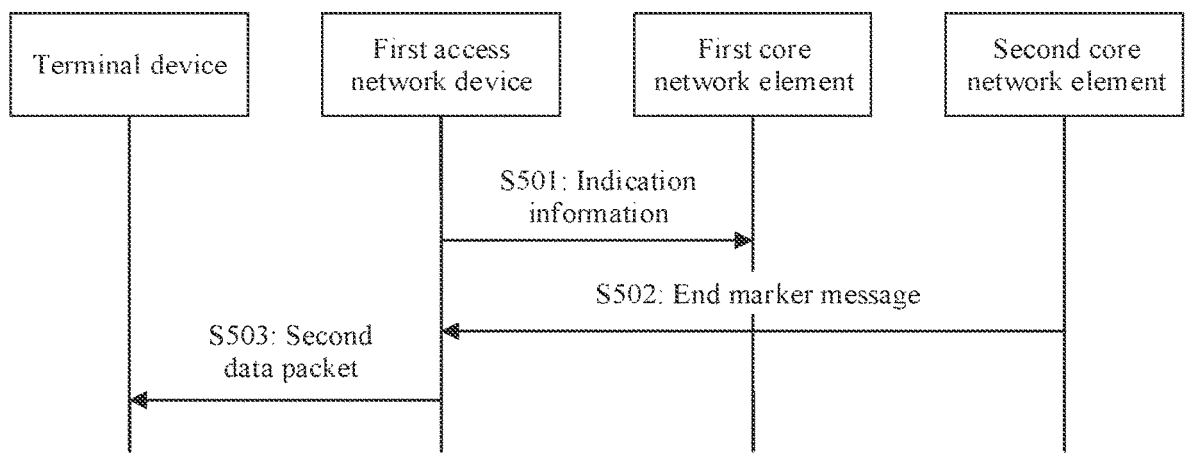
FIG. 12 is a flowchart of still yet another data processing method according to an embodiment of this application.

Embodiment 5 describes, from a perspective of a source node based on Embodiment 2, a data processing method provided in this embodiment of this application. As shown in FIG. 12, the method includes the following steps.

S501: A first access network device sends indication information to a first core network element. For details, refer to S202.

The indication information is used to indicate a first data flow that is in a first session and that is to be switched to a second access network device.

The first access network device may be the M-RAN node in FIG. 8, the second access network device may be the S-RAN node in FIG. 8, and the first core network element may be the AMF in FIG. 8. An end marker message may be the first end marker message in FIG. 8, the first session may be the packet data unit session PDU Session in Embodiment 2, the data flow may be the QoS flow in Embodiment 2, and the first data flow may be the to-be-switched QoS flow in Embodiment 2.

For a specific description of S501, refer to S202. Details are not described herein again.

S502: The first access network device receives an end marker (end marker) message from a second core network element.

The second core network element may be the UPF in FIG. 8.

For a specific description of S502, refer to S208. Details are not described herein again.

S503: The first access network device receives a second data packet of a second data flow in the first session after receiving the end marker message, and the first access network device sends the second data packet to a terminal device.

The second data flow is a data flow kept on the first access network device. For a specific description of S505, refer to S208, S208a, and S208b. Details are not described herein again.

The first access network device may determine, based on the to-be-switched first data flow, that the end marker message works on the first data flow. Because the end marker message works on the first data flow, the end marker message does not works on a data flow other than the first data flow in the first session. For details, refer to S208. Details are not described herein again.

Optionally, S501 may alternatively be: A first access network device receives indication information from a first core network element, where the indication information is used to indicate a first data flow that is in a first session and that is switched from the first access network device. For details, refer to S210. Details are not described herein again.

The first access network device may determine, based on the switched first data flow, that the end marker message works on the first data flow. Because the end marker message works on the first data flow, the end marker message does not works on a data flow other than the first data flow in the first session. For details, refer to S208. Details are not described herein again.

Optionally, S501 further includes: The first access network device may learn, in a data flow switch procedure, the data flow switched from the first access network device, and a specific learning manner is not limited. For a specific description, refer to S202 and S210. Details are not described herein again.

Optionally, the end marker message includes second indication information, and the second indication information is used to indicate a data flow switch scenario. The data flow switch scenario means that the end marker message works on a part of data flows in the first session instead of all data flows in the first session. Therefore, the first access network device may use, based on the second indication information, the data flow switched from the first access network device as the data flow on which the end marker message works. For a specific description, refer to S207. Details are not described herein again.

Optionally, S503 includes: The first access network device receives a first data packet of the first data flow after receiving the end marker message, and the first access network device discards the first data packet. For a specific description, refer to S208a. Details are not described herein again.

According to this solution, the first access network device can correctly distinguish, based on the learned data flow that is switched from the first access network device, the data flow on which the end marker works, and after receiving the end marker message, the first access network device continues to send a data packet of the second data flow kept on the first access network device to the terminal device without discarding the data packet of the second data flow. This avoids a transmission interruption of the second data flow, and ensures service continuity.

Embodiment 6

Figure 13:
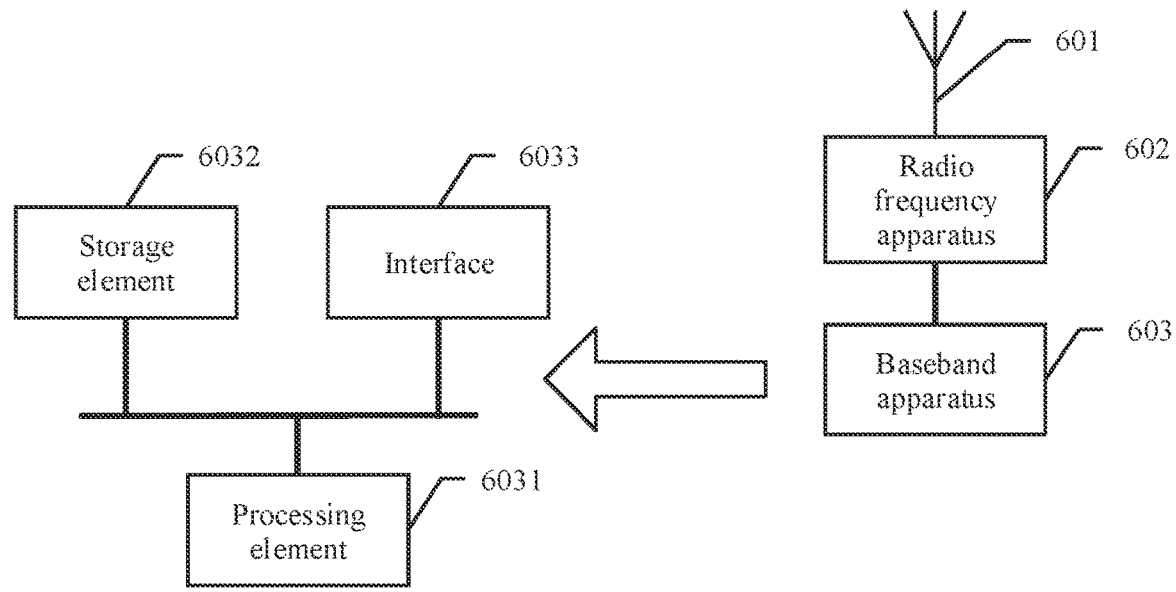
FIG. 13 is a schematic diagram of a structure of an access network apparatus according to an embodiment of this application.

This embodiment provides an access network apparatus. The access network apparatus may be configured to implement, for example, functions of the M-RAN node in Embodiment 1, or functions of the first access network device in Embodiment 3. FIG. 13 is a schematic diagram of a structure of an access network apparatus according to an embodiment of this application. The access network apparatus includes an antenna 601, a radio frequency apparatus 602, and a baseband apparatus 603. The antenna 601 is connected to the radio frequency apparatus 602. In an uplink direction, the radio frequency apparatus 602 receives, through the antenna 601, information sent by a terminal device, and sends the information sent by the terminal device to the baseband apparatus 603 for processing. In a downlink direction, the baseband apparatus 603 processes information of the terminal device, and sends processed information to the radio frequency apparatus 602. The radio frequency apparatus 602 processes the information of the terminal device, and sends processed information to the terminal device through the antenna 601.

The baseband apparatus 603 may include one or more processing elements 6031, for example, include one main control CPU and another integrated circuit. In addition, the baseband apparatus 603 may further include a storage element 6032 and an interface 6033. The storage element 6032 is configured to store computer-executable instructions for executing the solutions of this application, and the processing element 6031 controls the execution. The interface 6033 is configured to exchange information with the radio frequency apparatus 602, and the interface is, for example, a common public radio interface (common public radio interface, CPRI). The processing element 6031 is configured to execute the computer-executable instructions stored in the storage element 6032, to implement the functions of the M-RAN node in Embodiment 1 of this application or the functions of the first access network device in Embodiment 3 of this application. The computer-executable instructions in this embodiment of this application may also be referred to as application program code. This is not specifically limited in this embodiment of this application. The method and/or steps implemented by the M-RAN node in Embodiment 1 or the first access network device in Embodiment 3 may alternatively be implemented by a chip on the baseband apparatus 603. The chip includes at least one processing element and an interface circuit. The processing element is configured to perform steps of any method performed by the M-RAN node or the first access network device, and the interface circuit is configured to communicate with another apparatus.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. The units described as separate parts may or may not be physically separate, and parts displayed as units may or may not be physical units, may be located in one position, or may be distributed on a plurality of network units. A part or all of the units may be selected based on actual requirements to achieve the objectives of the solutions of the embodiments.

The access network apparatus may be a general-purpose apparatus or a dedicated apparatus. For example, the access network apparatus may be a network server, a base station, or a device having a structure similar to that shown in FIG. 13. A type of the access network apparatus is not limited in this embodiment of this application.

It may be understood that the method and/or steps implemented by the M-RAN node in Embodiment 1 or the first access network device in Embodiment 3 may alternatively be implemented by a chip system that implements the functions of the M-RAN node in Embodiment 1 or the functions of the first access network device in Embodiment 3.

Embodiment 7

Figure 14:
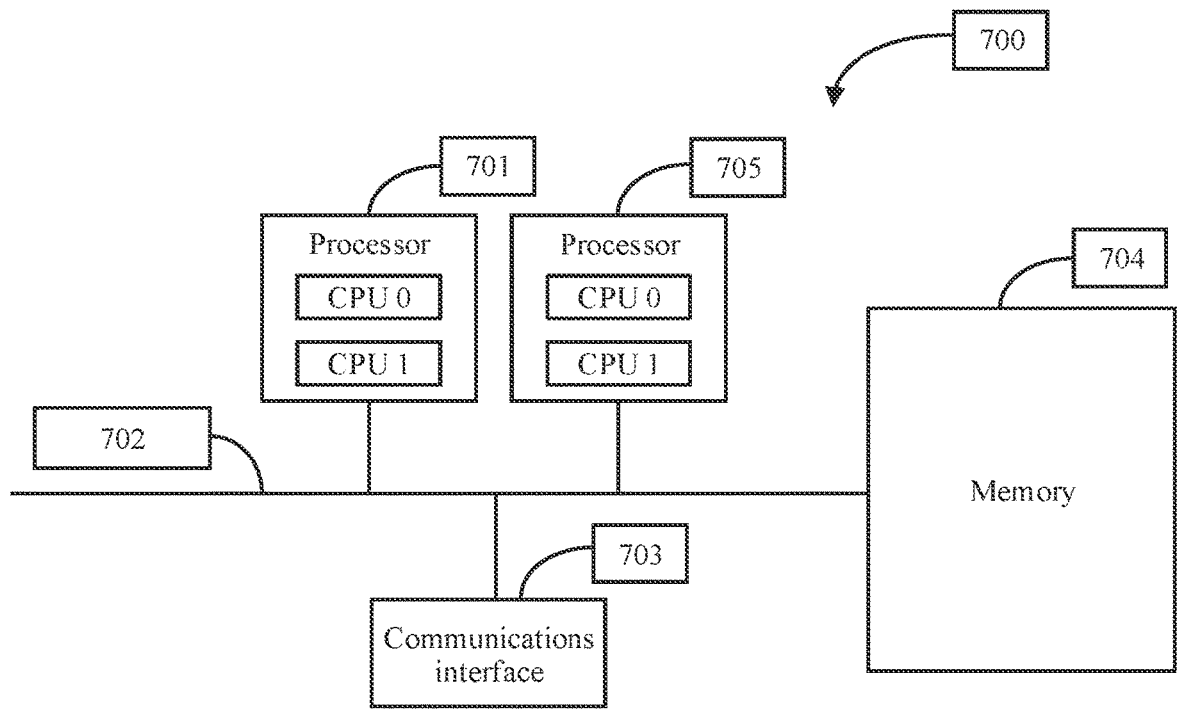
FIG. 14 is a schematic diagram of a structure of a core network apparatus according to an embodiment of this application.

This embodiment provides a core network apparatus. The core network apparatus may be configured to implement, for example, functions of the UPF in Embodiment 1, or functions of the core network element in Embodiment 4. The core network apparatus may be deployed on a core network side. FIG. 14 is a schematic diagram of a structure of a core network apparatus 700 according to an embodiment of this application. The core network apparatus 700 includes one or more processors 701, a communications line 702, and at least one communications interface (an example in which a communications interface 703 and one processor 701 are included is merely used for description in FIG. 14). Optionally, the core network apparatus 700 may further include a memory 704.

The processor 701 may be a general-purpose central processing unit (central processing unit, CPU), a microprocessor, an application-specific integrated circuit (application-specific integrated circuit, ASIC), or one or more integrated circuits configured to control program execution of the solutions of this application.

The communications line 702 is used to connect different components.

The communications interface 703 may be a transceiver module, and is configured to communicate with another device, a communications apparatus, or a communications network, for example, the Ethernet. For example, the transceiver module may be a network interface card or a fiber switch apparatus. Optionally, the communications interface 703 may alternatively be a transceiver circuit located in the processor 701, and is configured to implement signal input and signal output of the processor.

The memory 704 may be an apparatus having a storage function. For example, the memory 704 may be a read-only memory (read-only memory, ROM), another type of static storage device that can store static information and instructions, a random access memory (random access memory, RAM), or another type of dynamic storage device that can store information and instructions, or may be an electrically erasable programmable read-only memory (electrically erasable programmable read-only memory, EEPROM), a compact disc read-only memory (compact disc read-only memory, CD-ROM), another optical disk storage, an optical disc storage (including a compact disc, a laser disc, an optical disc, a digital versatile disc, a Blu-ray disc, or the like), a disk storage medium, another magnetic storage device, or any other medium that can be used to carry or store expected program code in a form of instructions or a data structure and that can be accessed by a computer. However, this is not limited thereto. The memory may exist independently, and is connected to the processor through the communications line 702. The memory may alternatively be integrated with the processor.

The memory 704 is configured to store computer-executable instructions for executing the solutions of this application, and the processor 701 controls the execution. The processor 701 is configured to execute the computer-executable instructions stored in the memory 704, to implement the functions of the UPF in Embodiment 1 of this application or the functions of the core network element in Embodiment 4. The computer-executable instructions in this embodiment of this application may also be referred to as application program code. This is not specifically limited in this embodiment of this application.

In specific implementation, in an embodiment, the processor 701 may include one or more CPUs, for example, a CPU 0 and a CPU 1 in FIG. 14.

In specific implementation, in an embodiment, the core network apparatus 700 may include a plurality of processors, for example, the processor 701 and a processor 705 in FIG. 14. Each of the processors may be a single-core (single-CPU) processor, or may be a multi-core (multi-CPU) processor. The processor herein may be one or more devices, circuits, and/or processing cores used to process data (for example, computer program instructions).

The core network apparatus 700 may be a general-purpose apparatus or a dedicated apparatus. For example, the core network apparatus 700 may be a network server, an embedded device, or a device having a structure similar to that shown in FIG. 14. A type of the core network apparatus 700 is not limited in this embodiment of this application.

It may be understood that the method and/or steps implemented by the UPF in Embodiment 1 or the core network element in Embodiment 3 may alternatively be implemented by a chip system that implements the functions of the UPF or the functions of the core network element.

Embodiment 8

This embodiment provides an access network apparatus. The access network apparatus may be configured to implement, for example, functions of the M-RAN node in Embodiment 2, or functions of the first access network device in Embodiment 5. For a schematic diagram of a structure of an access network apparatus provided in this embodiment of this application, refer to FIG. 13.

A processing element of a baseband apparatus is configured to execute computer-executable instructions stored in a storage element of the baseband apparatus, to implement the functions of the M-RAN node in Embodiment 2 of this application or the functions of the first access network device in Embodiment 5 of this application. The computer-executable instructions in this embodiment of this application may also be referred to as application program code. This is not specifically limited in this embodiment of this application. The method and/or steps implemented by the M-RAN node in Embodiment 2 or the first access network device in Embodiment 3 may alternatively be implemented by a chip on the baseband apparatus. The chip includes at least one processing element and an interface circuit. The processing element is configured to perform steps of any method performed by the M-RAN node in Embodiment 2 or the first access network device in Embodiment 5, and the interface circuit is configured to communicate with another apparatus.

It may be understood that the method and/or steps implemented by the M-RAN node in Embodiment 2 or the first access network device in Embodiment 5 may alternatively be implemented by a chip system that implements the functions of the M-RAN node in Embodiment 2 or the functions of the first access network device in Embodiment 5.

Embodiment 9

This embodiment provides an access network apparatus. The access network apparatus may be configured to implement, for example, functions of the M-RAN node in Embodiment 1, or functions of the first access network device in Embodiment 3. In this embodiment of this application, the access network apparatus may be divided into functional units based on the foregoing method embodiment. For example, functional units may be obtained through division based on corresponding functions, or two or more units integrated into one processing module. The integrated unit may be implemented in a form of hardware, or may be implemented in a form of a software functional module. It should be noted that, in this embodiment of this application, division into the units is an example, and is merely logical function division. In actual implementation, another division manner may be used.

Figure 15:
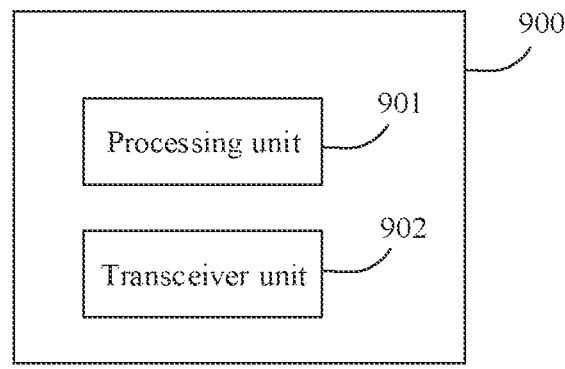
FIG. 15 is a schematic diagram of a structure of another access network apparatus according to an embodiment of this application.

FIG. 15 is a schematic diagram of a structure of an access network apparatus 900 according to an embodiment of this application. The access network apparatus 900 includes a processing unit 901 and a transceiver unit 902.

Optionally, the processing unit 901 is specifically configured to implement a function of determining the switched data flow based on the indication information in the end marker message in S108 and S302.

Optionally, the processing unit 901 is specifically configured to implement a function of discarding the data packet of the switched data flow in S108a and S302.

Optionally, the transceiver unit 902 is specifically configured to implement a function of receiving the data forwarding address in S101.

Optionally, the transceiver unit 902 is specifically configured to implement a function of sending a buffered data packet of the to-be-switched QoS flow in S101.

Optionally, the transceiver unit 902 is specifically configured to implement a function of sending the N2 quality of service flow mobility indication information in S102.

Optionally, the transceiver unit 902 is specifically configured to implement a function of receiving the end marker message in S108 and S301.

Optionally, the transceiver unit 902 is specifically configured to implement a function of sending the data packet of the second data flow in S108 and S302.

Optionally, the transceiver unit 902 is specifically configured to implement a function of sending the second end marker message in S109.

Optionally, the transceiver unit 902 is specifically configured to implement a function of receiving the QoS switch acknowledgment information in S110.

Specifically, functions/implementation processes of the transceiver unit 902 and the processing unit 901 in FIG. 15 may be implemented by the processor 601 in the access network apparatus 600 shown in FIG. 13 by invoking the computer-executable instructions stored in the memory 604. Alternatively, functions/an implementation process of the processing unit 901 in FIG. 15 may be implemented by the processor 601 in the access network apparatus 600 shown in FIG. 13 by invoking the computer-executable instructions stored in the memory 604. Functions/an implementation process of the transceiver unit 902 in FIG. 15 may be implemented by the communications interface 603 in the access network apparatus 600 shown in FIG. 13.

Specifically, functions/implementation processes of the transceiver unit 902 and the processing unit 901 in FIG. 15 may be implemented by the processing element 6031 of the baseband apparatus 603 in the access network apparatus shown in FIG. 13 by invoking the computer-executable instructions stored in the storage element 6032. Alternatively, functions/an implementation process of the processing unit 901 in FIG. 15 may be implemented by the processing element 6031 of the baseband apparatus 603 in the access network apparatus shown in FIG. 13 by invoking the computer-executable instructions stored in the storage element 6032. Functions/an implementation process of the transceiver unit 902 in FIG. 15 may be implemented by the interface 6033, the radio frequency apparatus 602, and the antenna 601 in the access network apparatus shown in FIG. 13.

Embodiment 10

This embodiment provides a core network apparatus. The core network apparatus may be configured to implement, for example, functions of the UPF in Embodiment 1, or functions of the core network element in Embodiment 4. In this embodiment of this application, the core network apparatus may be divided into functional units based on the foregoing method embodiment. For example, functional units may be obtained through division based on corresponding functions, or two or more units integrated into one processing module. The integrated unit may be implemented in a form of hardware, or may be implemented in a form of a software functional module. It should be noted that, in this embodiment of this application, division into the units is an example, and is merely logical function division. In actual implementation, another division manner may be used.

Figure 16:
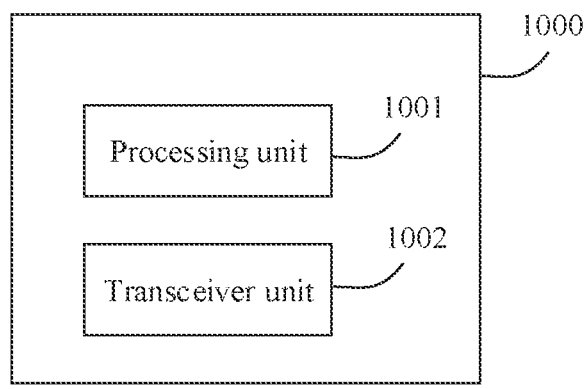
FIG. 16 is a schematic diagram of a structure of another core network apparatus according to an embodiment of this application.

FIG. 16 is a schematic diagram of a structure of an core network apparatus 1000 according to an embodiment of this application. The core network apparatus 1000 includes a processing unit 1001 and a transceiver unit 1002.

Optionally, the processing unit 1001 is specifically configured to implement a function of switching the to-be-switched QoS flow to the S-RAN node in S104.

Optionally, the processing unit 1001 is specifically configured to implement a function of generating the end marker message in S107 and S401.

Optionally, the transceiver unit 1002 is specifically configured to implement a function of receiving the N4 session modification request in S104.

Optionally, the transceiver unit 1002 is specifically configured to implement a function of sending the N4 session modification response in S105.

Optionally, the transceiver unit 1002 is specifically configured to implement a function of receiving the end marker message in S107.

Optionally, the transceiver unit 1002 is specifically configured to implement a function of sending the end marker message in S108 and S401.

Specifically, functions/implementation processes of the transceiver unit 1002 and the processing unit 1001 in FIG. 16 may be implemented by the processor 701 in the core network apparatus 700 shown in FIG. 14 by invoking the computer-executable instructions stored in the memory 704. Alternatively, functions/an implementation process of the processing unit 1001 in FIG. 16 may be implemented by the processor 701 in the core network apparatus 700 shown in FIG. 14 by invoking the computer-executable instructions stored in the memory 704. Functions/an implementation process of the transceiver unit 1002 in FIG. 16 may be implemented by the communications interface 703 in the access network apparatus 700 shown in FIG. 14.

Embodiment 11

This embodiment provides an access network apparatus. The access network apparatus may be configured to implement, for example, functions of the M-RAN node in Embodiment 2, or functions of the first access network device in Embodiment 5. In this embodiment of this application, the access network apparatus may be divided into functional units based on the foregoing method embodiment. For example, functional units may be obtained through division based on corresponding functions, or two or more units integrated into one processing module. The integrated unit may be implemented in a form of hardware, or may be implemented in a form of a software functional module. It should be noted that, in this embodiment of this application, division into the units is an example, and is merely logical function division. In actual implementation, another division manner may be used.

Figure 17:
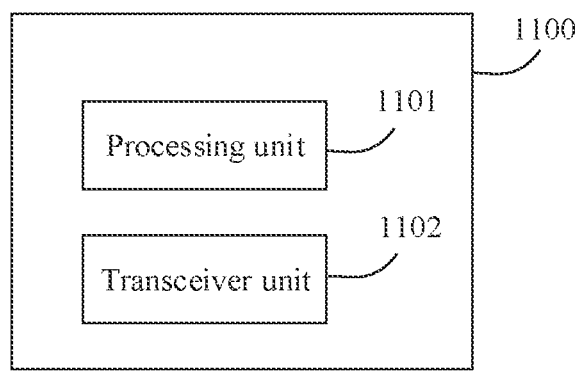
FIG. 17 is a schematic diagram of a structure of still another access network apparatus according to an embodiment of this application.

FIG. 17 is a schematic diagram of a structure of an access network apparatus 1100 according to an embodiment of this application. The access network apparatus 1100 includes a processing unit 1101 and a transceiver unit 1102.

Optionally, the processing unit 1101 is specifically configured to implement a function of determining the switched data flow based on the indication information in the end marker message in S208 and S503.

Optionally, the processing unit 1101 is specifically configured to implement a function of discarding the data packet of the switched data flow in S208a and S503.

Optionally, the transceiver unit 1102 is specifically configured to implement a function of receiving the data forwarding address in S201.

Optionally, the transceiver unit 1102 is specifically configured to implement a function of sending a buffered data packet of the to-be-switched QoS flow in S201.

Optionally, the transceiver unit 1102 is specifically configured to implement a function of sending the indication information in S202 and S501.

Optionally, the transceiver unit 1102 is specifically configured to implement a function of receiving the end marker message in S208 and S502.

Optionally, the transceiver unit 1102 is specifically configured to implement a function of sending the data packet of the second data flow in S208 and S503.

Optionally, the transceiver unit 1102 is specifically configured to implement a function of sending the second end marker message in S209.

Optionally, the transceiver unit 1102 is specifically configured to implement a function of receiving the QoS switch acknowledgment information in S210.

Specifically, functions/implementation processes of the transceiver unit 1102 and the processing unit 1101 in FIG. 17 may be implemented by the processing element of the baseband apparatus in the access network apparatus in Embodiment 8 by invoking the computer-executable instructions stored in the storage element. Alternatively, functions/an implementation process of the processing unit 1101 in FIG. 17 may be implemented by the processing element of the baseband apparatus in the access network apparatus in Embodiment 8 by invoking the computer-executable instructions stored in the storage element. Functions/an implementation process of the transceiver unit 1102 in FIG. 17 may be implemented by the interface, the radio frequency apparatus, and the antenna in the access network apparatus in Embodiment 8.

Embodiment 12

This embodiment provides a communications system. The communications system may include the access network apparatus in Embodiment 6 or the access network apparatus in Embodiment 9, and may further include the core network apparatus in Embodiment 7 or the core network apparatus in Embodiment 10.

Embodiment 13

This embodiment provides a communications system. The communications system may include the access network apparatus in Embodiment 8 or the access network apparatus in Embodiment 11.

All or a part of the foregoing embodiments may be implemented by software, hardware, firmware, or any combination thereof. When a software program is used to implement the embodiments, all or a part of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like. In this embodiment of this application, the computer may include the apparatuses described above.

In the description of this application, unless otherwise specified, "/" indicates an "or" relationship between associated objects. For example, A/B may indicate A or B. A and B may be singular or plural. In addition, in the description of this application, "a plurality of" means two or more than two, unless otherwise specified. "At least one of the following items (pieces)" or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, to clearly describe the technical solutions in the embodiments of this application, terms such as "first" and "second" are used in the embodiments of this application to distinguish between same items or similar items that have basically same functions and purposes. A person skilled in the art may understand that the terms such as "first" and "second" do not limit a quantity or an execution sequence, and the terms such as "first" and "second" do not indicate a definite difference. In addition, in the embodiments of this application, the word such as "example" or "for example" is used to represent giving an example, an illustration, or a description. Any embodiment or design scheme described as "in an example" or "for example" in the embodiments of this application should not be explained as being more preferred or having more advantages than another embodiment or design scheme. Exactly, use of the word "example", "for example", or the like is intended to present a relative concept in a specific manner for ease of understanding.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a meaning of plurality. A single processor or another unit may implement several functions enumerated in the claims.

Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and accompanying drawings are merely example description of this application defined by the appended claims, and is considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A data processing method, comprising:
sending, by a first access network device, indication information to a first core network element, wherein the indication information indicates a first data flow that is in a first session and that is to-be-switched, and the indication information comprises information for triggering to send an end marker message;
receiving, by the first access network device, an end marker message from a second core network element, wherein the end marker message indicates that the end marker message works on a switched data flow in the first session;
determining, by the first access network device based on the first data flow, that the end marker message works on the first data flow; and
when the first access network device receives a second data packet of a second data flow in the first session after receiving the end marker message, sending, by the first access network device, the second data packet to a terminal device, wherein
the second data flow is a data flow kept on the first access network device;
wherein the first core network element is a session management function network element, and the second core network element is a user plane function network element.

2. The method according to claim 1, further comprising:
when the first access network device receives a first data packet of the first data flow after receiving the end marker message, discarding, by the first access network device, the first data packet.

3. The method according to claim 1, wherein
the first access network device is a master base station; or
the first access network device is a secondary base station.

4. The method according to claim 1, wherein
the first session is a packet data unit (PDU) session, and the data flow is a quality of service (QoS) flow.

5. A communication apparatus, comprising at least one transceiver and at least one processor; and
one or more memories coupled to the at least one processor and storing programming instructions for execution by the at least one processor to perform operations comprising:
sending indication information to a first core network element, wherein the indication information indicates a first data flow that is in a first session and that is to-be-switched, and the indication information comprises information for triggering to send an end marker message;
receiving an end marker message from a second core network element, wherein the end marker message indicates that the end marker message works on a switched data flow in the first session;
determining based on the first data flow, that the end marker message works on the first data flow; and
sending a second data packet of a second data flow in the first session received after the end marker message to a terminal device, wherein the second data flow is a data flow kept on the communication apparatus;
wherein the first core network element is a session management function network element, and the second core network element is a user plane function network element.

6. The communication apparatus according to claim 5, wherein the operations comprise:
discarding a first data packet of the first data flow received after the end marker message.

7. The communication apparatus according to claim 5, wherein the communication apparatus is a master base station; or a secondary base station.

8. The communication apparatus according to claim 5, wherein
the first session is a packet data unit (PDU) session, and the data flow is a quality of service (QoS) flow.

9. A non-transitory computer-readable storage medium storing one or more programming instructions executable by at least one processor to cause the at least one processor to execute:
sending indication information to a first core network element, wherein the indication information indicates a first data flow that is in a first session and that is to-be-switched, and the indication information comprises information for triggering to send an end marker message;
receiving an end marker message from a second core network element, wherein the end marker message indicates that the end marker message works on a switched data flow in the first session;
determining based on the first data flow, that the end marker message works on the first data flow; and
sending a second data packet of a second data flow in the first session received after the end marker message to a terminal device, wherein the second data flow is a data flow kept on a first access network device;
wherein the first core network element is a session management function network element, and the second core network element is a user plane function network element.

10. The non-transitory computer-readable storage medium according to claim 9, wherein the one or more programming instructions further cause the at least one processor to execute:
discarding a first data packet of the first data flow received after the end marker message.

11. The non-transitory computer-readable storage medium according to claim 9, wherein
the first session is a packet data unit (PDU) session, and the data flow is a quality of service (QoS) flow.

12. The method according to claim 1, wherein the indication information is a N2 QoS flow mobility indication or PDU session resource modify indication.

13. The method according to claim 1, wherein the indication information comprises a session identifier of the first session, and a quality of service flow identifier (QFI) of the first data flow.

14. The communication apparatus according to claim 5, wherein the indication information is a N2 QoS flow mobility indication or PDU session resource modify indication.

15. The communication apparatus according to claim 5, wherein the indication information comprises a session identifier of the first session, and a quality of service flow identifier (QFI) of the first data flow.

16. The non-transitory computer-readable storage medium according to claim 9, wherein the indication information is a N2 QoS flow mobility indication or PDU session resource modify indication.

17. The non-transitory computer-readable storage medium according to claim 9, wherein the indication information comprises a session identifier of the first session, and a quality of service flow identifier (QFI) of the first data flow.

* * * * *